United States Patent
Takahata et al.

(10) Patent No.: US 7,268,770 B1
(45) Date of Patent: Sep. 11, 2007

(54) LIQUID CRYSTAL DISPLAY OF TOUCH INPUT TYPE, AND METHOD OF MANUFACTURE

(75) Inventors: Kazuhiko Takahata, Kyoto (JP); Takao Hashimoto, Kyoto (JP); Kazuhiro Nishikawa, Kyoto (JP); Shinya Yamada, Kyoto (JP); Yasuji Kusuda, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/582,864

(22) PCT Filed: Jan. 8, 1999

(86) PCT No.: PCT/JP99/00036

§ 371 (c)(1),
(2), (4) Date: Jul. 6, 2000

(87) PCT Pub. No.: WO99/35531

PCT Pub. Date: Jul. 15, 1999

(30) Foreign Application Priority Data

Jan. 9, 1998 (JP) .................................. 10-014850
Jul. 30, 1998 (JP) .................................. 10-215198

(51) Int. Cl.
*G06F 3/041* (2006.01)
(52) U.S. Cl. ........................... 345/173; 349/12; 349/58
(58) Field of Classification Search .................. 349/12, 349/162, 156, 158, 130; 345/173–183, 104
See application file for complete search history.

(56) References Cited

U.S. PATENT DOCUMENTS 5,498,657 A * 3/1996 Sugiyama et al. .......... 524/463
5,833,878 A * 11/1998 Shinohara .............. 252/299.01
5,852,487 A * 12/1998 Fujimori et al. ............ 345/104
6,020,945 A * 2/2000 Sawai et al. ................ 349/119
6,108,064 A * 8/2000 Minoura et al. ............ 349/113
6,136,444 A * 10/2000 Kon et al. ................ 428/423.1
6,456,279 B1 * 9/2002 Kubo et al. ................. 345/173

FOREIGN PATENT DOCUMENTS

| JP | 57-178220 | 11/1982 |
| JP | 61-174587 | 8/1986 |
| JP | 07-105781 | * 4/1995 |
| JP | 10-48625 | 2/1998 |
| JP | 10-186136 | 7/1998 |

* cited by examiner

*Primary Examiner*—David Nelms
*Assistant Examiner*—Richard Kim
(74) *Attorney, Agent, or Firm*—Wenderoth, Lind & Ponack, L.L.P.

(57) ABSTRACT

A touch-input type liquid crystal display device comprises an upper and lower polarizer, a transparent touch panel disposed between the polarizers and a liquid crystal display. The transparent touch panel comprises upper and lower optical phase difference films, a movable electrode portion and a stationary electrode portion. A space is interposed between the optical phase difference films. The transparent touch panel is disposed between the upper polarizer and the liquid crystal display. The liquid crystal display is disposed between the transparent touch panel and the lower polarizer. The optical phase difference films are capable of providing a ¼ wavelength phase delay to light, incident thereon, having a center wavelength within a visible region. The movable electrode portion is disposed on a lower surface of the upper optical phase difference film. The stationary electrode portion is disposed on an upper surface of the lower optical phase difference film.

17 Claims, 12 Drawing Sheets

LIQUID CRYSTAL DISPLAY OF TOUCH INPUT TYPE, AND METHOD OF MANUFACTURE

TECHNICAL FIELD

The present invention relates to a liquid crystal display device of a touch input type, as well as its fabricating method, which is high in contrast and high in visibility by virtue of its capability of suppressing reflected light of fluorescent lamps or the like indoors, and reflected light due to external light outdoors. The present invention also relates to a liquid crystal display device of a touch input type, as well as its fabricating method, which is high in contrast and high in visibility by virtue of its capability of suppressing reflected light of fluorescent lamps or the like indoors, and reflected light due to external light outdoors and moreover which is superior in surface durability and prevented from moisture absorption into its upper polarizer.

BACKGROUND ART

Conventionally, there has been provided a touch-input type liquid crystal display device in which a liquid crystal display 2 is provided under a transparent touch panel 1, the transparent touch panel 1 having a movable-side sheet 20 and a stationary-side sheet 21 disposed with a space layer 7 interposed therebetween, and in which an upper polarizer 8 and a lower polarizer 9 are disposed on the upper and lower surfaces of the liquid crystal display 2 (see FIG. 17).

There has also been provided a liquid crystal display device in which the upper polarizer 8 is not provided on the upper surface of the liquid crystal display 2 but provided on the upper surface of the movable-side sheet 20 of the transparent touch panel 1 so as to increase its contrast (see FIG. 18).

However, with such a touch-input type liquid crystal display device having the above constitution, in such places as a room with a fluorescent lamp 504 as shown in FIG. 19 or an outdoor place as shown in FIG. 20, when input work is done by a pen 503 or 501 into a portable personal computer 502 or portable terminal unit 500 having a touch-input type liquid crystal display device, the display screen would be quite hard to view because of the reflection of light at two places, one being an interface between a space layer of the transparent touch panel 1 of the liquid crystal display device and a stationary electrode portion set on the upper surface of the stationary-side sheet and another being the uppermost surface of the transparent touch panel 1. The reason of this is that at the passage of light from one medium of lower refractive index to another of higher refractive index, the larger the difference between those refractive indices is, the more the reflection of light occurs at the interface.

In the case of the constitution in which the upper polarizer 8 is disposed on the upper surface of the movable-side sheet 20 of the transparent touch panel 1, indeed a method of preventing reflected light by forming the upper surface of the upper polarizer 8 into a satin finish state is also available, but reflected light cannot be suppressed enough.

Accordingly, an object of the present invention is to provide a liquid crystal display device of a touch input type, as well as its fabricating method, which is low in reflection, high in contrast, and high in visibility even in such places as indoors with fluorescent lamps or the like and outdoors, by solving the above-described issues.

DISCLOSURE OF INVENTION

In order to achieve the above object, the present invention has the following constitutions.

According to a first aspect of the present invention, there is provided a touch-input type liquid crystal display device having a liquid crystal display below a touch panel, in which an upper polarizer is disposed on an upper surface of a transparent touch panel in which an upper optical phase difference film and a lower optical phase difference film are disposed with a space layer interposed therebetween. The upper optical phase difference film serves to give a phase delay of a ¼ wavelength to incident light of a center wavelength within a visible region and has a movable electrode portion on a lower surface thereof. The lower optical phase difference film serves to give a phase delay of a ¼ wavelength to the incident light of the center wavelength within the visible region and has a stationary electrode portion on an upper surface thereof. A lower polarizer is disposed on a lower surface of the liquid crystal display. An angle formed by an optical axis of the upper optical phase difference film and a polarization axis of the upper polarizer is about 45°. An angle formed by an optical axis of the lower optical phase difference film and linearly polarized light that is to be outputted from a device surface out of linear polarization emitted from the liquid crystal display is about 45°. An angle formed by the optical axis of the upper optical phase difference film and the optical axis of the lower optical phase difference film is about 90°. An angle formed by the polarization axis of the upper polarizer and linearly polarized light that is to be outputted from the device surface out of linearly polarized light emitted from the liquid crystal display is 90°.

According to a second aspect of the present invention, there is provided a touch-input type liquid crystal display device according to the first aspect, wherein the stationary electrode portion is formed directly on the lower optical phase difference film.

According to a third aspect of the present invention, there is provided a touch-input type liquid crystal display device according to the first aspect, wherein a glass substrate having optical isotropy is disposed between the stationary electrode portion and the lower optical phase difference film. The stationary electrode portion in the third aspect is formed directly on the glass substrate having optical isotropy.

According to a fourth aspect of the present invention, there is provided a touch-input type liquid crystal display device according to the first aspect, wherein an optically isotropic film is disposed between the stationary electrode portion and the lower optical phase difference film. The stationary electrode portion in the fourth aspect is formed directly on the optically isotropic film.

According to a fifth aspect of the present invention, there is provided a touch-input type liquid crystal display device according to the second aspect, wherein both the upper optical phase difference film and the lower optical phase difference film have a thermal deformation temperature of not less than 150° C.

According to a sixth aspect of the present invention, there is provided a touch-input type liquid crystal display device according to the second aspect, wherein both the upper optical phase difference film and the lower optical phase difference film have a thermal deformation temperature of not less than 170° C.

According to a seventh aspect of the present invention, there is provided a touch-input type liquid crystal display device according to the third aspect, wherein the upper optical phase difference film has a thermal deformation temperature of not less than 150° C.

According to an eighth aspect of the present invention, there is provided a touch-input type liquid crystal display device according to the third aspect, wherein the upper optical phase difference film has a thermal deformation temperature of not less than 170° C.

According to a ninth aspect of the present invention, there is provided a touch-input type liquid crystal display device according to the fourth aspect, wherein both the upper optical phase difference film and the optically isotropic film have a thermal deformation temperature of not less than 150° C.

According to a 10th aspect of the present invention, there is provided a touch-input type liquid crystal display device according to the fourth aspect, wherein both the upper optical phase difference film and the optically isotropic film have a thermal deformation temperature of not less than 170° C.

According to an 11th aspect of the present invention, there is provided a touch-input type liquid crystal display device according to any one of the first to 10th aspects, wherein a transparent resin plate having optical isotropy is disposed between the transparent touch panel and the liquid crystal display.

According to a 12th aspect of the present invention, there is provided a touch-input type liquid crystal display device according to the fourth, ninth, or 10th aspect, wherein a transparent resin plate having optical isotropy is disposed between the optically isotropic film and the lower optical phase difference film.

According to a 13th aspect of the present invention, there is provided a touch-input type liquid crystal display device according to any one of the first to 12th aspects, wherein a thickness of the upper optical phase difference film is not less than 50 μm and not more than 150 μm.

According to a 14th aspect of the present invention, there is provided a touch-input type liquid crystal display device according to any one of the first to 13th aspects, wherein either one of a member on which the stationary electrode portion has been directly formed and the liquid crystal display. Further in accordance with the 14th aspect of the present invention, all of the stationary electrode portion-directly-formed member and the liquid crystal display and a member disposed between the stationary electrode portion-directly-formed member and the liquid crystal display are adhesively bonded overall by a transparent adhesive layer or a transparent re-peel sheet.

According to a 15th aspect of the present invention, there is provided a touch-input type liquid crystal display device according to any one of the first to 14th aspects, wherein a transparent film low in moisture permeability and superior in dimensional stability is laminated on an upper surface of the upper polarizer.

According to a 16th aspect of the present invention, there is provided a touch-input type liquid crystal display device according to the 15th aspect, further comprising a low-reflection processed layer on an upper surface of the transparent film laminated on the upper surface of the upper polarizer.

According to a 17th aspect of the present invention, there is provided a touch-input type liquid crystal display device according to the 15th aspect, further comprising an antifouling processed layer on an upper surface of the transparent film laminated on the upper surface of the upper polarizer.

According to an 18th aspect of the present invention, there is provided a touch-input type liquid crystal display device according to the 15th aspect, further comprising a hard coat processed layer on an upper surface of the transparent film laminated on the upper surface of the upper polarizer.

According to a 19th aspect of the present invention, there is provided a method for fabricating a touch-input type liquid crystal display device having a liquid crystal display below a touch panel, wherein in the liquid crystal display device, an upper polarizer is disposed on an upper surface of a transparent touch panel in which an upper optical phase difference film and a lower optical phase difference film are disposed with a space layer interposed therebetween, the upper optical phase difference film serving to give a phase delay of a ¼ wavelength to incident light of a center wavelength within a visible region and having a movable electrode portion on a lower surface thereof, and the lower optical phase difference film serving to give a phase delay of a ¼ wavelength to the incident light of the center wavelength within the visible region and having a stationary electrode portion on an upper surface thereof, and a lower polarizer is disposed on a lower surface of the liquid crystal display; wherein an angle formed by an optical axis of the upper optical phase difference film and a polarization axis of the upper polarizer is about 45°, an angle formed by an optical axis of the lower optical phase difference film and linearly polarized light that is to be outputted from a device surface out of linear polarization emitted from the liquid crystal display is about 45°, an angle formed by the optical axis of the upper optical phase difference film and the optical axis of the lower optical phase difference film is about 90°, and wherein an angle formed by the a polarization axis of the upper polarizer and linearly polarized light that is to be outputted from the device surface out of linearly polarized light emitted from the liquid crystal display is 90°.

The method in accordance with the 19th aspect of the present invention comprises obtaining a movable-side sheet by, after performing a heat treatment for removal of residual solvents in film material of the upper optical phase difference film, forming a transparent electrically conductive film for the movable electrode portion directly on the film material. After performing a heat treatment for reducing dimensional errors involved in formation of leads, the method includes forming leads of the movable electrode portion, and further performing a heat treatment for curing of binder of ink with which the leads have been formed, as well as for removal of solvents of the ink.

The method in accordance with the 19th aspect further includes obtaining a stationary-side sheet by, after performing a heat treatment for removal of residual solvents in film material of the lower optical phase difference film, forming a transparent electrically conductive film for the stationary electrode portion directly on the film material, and after performing a heat treatment for reducing dimensional errors involved in formation of leads, forming leads of the stationary electrode portion, and further performing a heat treatment for curing of binder of ink with which the leads have been formed, as well as for removal of solvents of the ink.

The method in accordance with the 19th aspect still further includes laminating together the movable-side sheet and the stationary-side sheet, then laminating the upper polarizer on an upper surface of the upper optical phase difference film of the movable-side sheet and thereafter performing a pressure degassing process. The method finally includes laminating together the stationary-side sheet with the liquid crystal display.

According to a 20th aspect of the present invention, there is provided a method for fabricating a touch-input type liquid crystal display device having a liquid crystal display below a touch panel, wherein in the liquid crystal display device, an upper polarizer is disposed on an upper surface of a transparent touch panel in which an upper optical phase difference film and a lower optical phase difference film are disposed with a space layer interposed therebetween, the upper optical phase difference film serving to give a phase delay of a ¼ wavelength to incident light of a center wavelength within a visible region and having a movable electrode portion on a lower surface thereof, and the lower optical phase difference film serving to give a phase delay of a ¼ wavelength to the incident light of the center wavelength within the visible region and having a stationary electrode portion on an upper surface thereof, and a lower polarizer is disposed on a lower surface of the liquid crystal display, wherein an angle formed by an optical axis of the upper optical phase difference film and a polarization axis of the upper polarizer is about 45°, an angle formed by an optical axis of the lower optical phase difference film and linearly polarized light that is to be outputted from a device surface out of linear polarization emitted from the liquid crystal display is about 45°, an angle formed by the optical axis of the upper optical phase difference film and the optical axis of the lower optical phase difference film is about 90°, and wherein an angle formed by the polarization axis of the upper polarizer and linearly polarized light that is to be outputted from the device surface out of linearly polarized light emitted from the liquid crystal display is 90°.

The method in accordance with the 20th aspect of the present invention comprises obtaining a movable-side sheet by, after performing a heat treatment for removal of residual solvents in film material of the upper optical phase difference film, forming a transparent electrically conductive film for the movable electrode portion directly on the film material, and after performing a heat treatment for reducing dimensional errors involved in formation of leads, forming leads of the movable electrode portion, and further performing a heat treatment for curing of binder of ink with which the leads have been formed, as well as for removal of solvents of the ink.

The method in accordance with the 20th aspect of the present invention additionally comprises obtaining a stationary-side sheet by forming a transparent electrically conductive film for the stationary electrode portion directly on a glass substrate having optical isotropy, forming leads of the stationary electrode portion, and performing a heat treatment for curing of binder of ink with which the leads have been formed, as well as for removal of solvents of the ink.

The method in accordance with the 20th aspect of the present invention further comprises laminating together the movable-side sheet and the stationary-side sheet, and then, laminating the upper polarizer on an upper surface of the upper optical phase difference film of the movable-side sheet and thereafter performing a pressure degassing process.

The method in accordance with the 20th aspect of the present invention finally includes laminating together the stationary-side sheet with the liquid crystal display with the lower optical phase difference film interposed therebetween.

According to a 21st aspect of the present invention, there is provided a method for fabricating a touch-input type liquid crystal display device having a liquid crystal display below a touch panel, wherein in the liquid crystal display device, an upper polarizer is disposed on an upper surface of a transparent touch panel in which an upper optical phase difference film and a lower optical phase difference film are disposed with a space layer interposed therebetween, the upper optical phase difference film serving to give a phase delay of a ¼ wavelength to incident light of a center wavelength within a visible region and having a movable electrode portion on a lower surface thereof, and the lower optical phase difference film serving to give a phase delay of a ¼ wavelength to the incident light of the center wavelength within the visible region and having a stationary electrode portion on an upper surface thereof; and a lower polarizer is disposed on a lower surface of the liquid crystal display, wherein an angle formed by an optical axis of the upper optical phase difference film and a polarization axis of the upper polarizer is about 45°, an angle formed by an optical axis of the lower optical phase difference film and linearly polarized light that is to be outputted from a device surface out of linear polarization emitted from the liquid crystal display is about 45°, an angle formed by the optical axis of the upper optical phase difference film and the optical axis of the lower optical phase difference film is about 90°, and wherein an angle formed by the a polarization axis of the upper polarizer and linearly polarized light that is to be outputted from the device surface out of linearly polarized light emitted from the liquid crystal display is 90°.

The method in accordance with the 21st aspect of the present invention comprises obtaining a movable-side sheet by, after performing a heat treatment for removal of residual solvents in film material of the upper optical phase difference film, forming a transparent electrically conductive film for the movable electrode portion directly on the film material, and after performing a heat treatment for reducing dimensional errors involved in formation of leads, forming leads of the movable electrode portion, and further performing a heat treatment for curing of binder of ink with which the leads have been formed, as well as for removal of solvents of the ink.

The method in accordance with the 21st aspect of the present invention further comprises obtaining a stationary-side sheet by, after performing a heat treatment for removal of residual solvents in film material of an optically isotropic film, forming a transparent electrically conductive film for the stationary electrode portion directly on the film material, and after performing a heat treatment for reducing dimensional errors involved in formation of leads, forming leads of the stationary electrode portion, and further performing a heat treatment for curing of binder of ink with which the leads have been formed, as well as for removal of solvents of the ink.

The method in accordance with the 21st aspect of the present invention still further comprises laminating together the movable-side sheet and the stationary-side sheet, laminating the upper polarizer on an upper surface of the upper optical phase difference film of the movable-side sheet and thereafter performing a pressure degassing process and laminating together the stationary-side sheet with the liquid crystal display with the lower optical phase difference film interposed therebetween.

According to a 22nd aspect of the present invention, there is provided a method for fabricating a touch-input type liquid crystal display device according to any one of the 19th to 21st aspects, wherein the heat treatment for removal of the residual solvents in the film materials is performed at a temperature of not less than 150° C.

According to a 23rd aspect of the present invention, there is provided a method for fabricating a touch-input type liquid crystal display device according to any one of the 19th to 22nd aspects, wherein the heat treatment for reducing dimensional errors involved in the formation of the leads is performed at a temperature of not less than 100° C. and less than 130° C.

According to a 24th aspect of the present invention, there is provided a method for fabricating a touch-input type liquid crystal display device according to any one of the 19th to 23rd aspects, wherein the heat treatment for curing of the binder of the ink with which the leads have been formed, as well as for removal of the solvents of the ink is performed at a temperature of not less than 100° C. and less than 150° C.

According to a 25th aspect of the present invention, there is provided a method for fabricating a touch-input type liquid crystal display device according to any one of the 19th to 24th aspects, wherein the pressure degassing process is performed at 40-80° C. and 4-9 kg/cm² for 10-120 minutes.

According to a 26th aspect of the present invention, there is provided a method for fabricating a touch-input type liquid crystal display device according to any one of the 19th to 25th aspects, wherein electrode-routed portions are preparatorily provided in either one of the movable electrode portion and the stationary electrode portion, and after laminating together the movable-side sheet and the stationary-side sheet, and pressed against and adhered to a connector via an anisotropic conductive adhesive at a temperature of not less than 120° C. and less than 170° C.

The touch-input type liquid crystal display device according to the present invention, having the above-described constitutions and functions, produces the following advantages.

That is, by the arrangement that the angle formed by the polarization axis of the upper polarizer and the optical axis of the upper optical phase difference film is set to about 45°, light enters the space layer of the transparent touch panel in the form of circularly polarized light or generally circularly polarized light, and reflected circularly polarized light or generally circularly polarized light passes through the upper optical phase difference film again, resulting in linearly polarized light vertical to the transmission axis of the upper polarizer, so that reflected light is suppressed. The term, polarization axis (or absorption axis) of the upper polarizer, refers to an axis parallel to the drawing direction of the film material. Light passing through the upper polarizer is polarized, going out from the upper polarizer as linearly polarized light only in a direction perpendicular to the absorption axis. It is noted that an axis perpendicular to the absorption axis is referred to as a transmission axis. In order to allow the linearly polarized light to be transmitted through this upper polarizer, the transmission axis and the direction of the linearly polarized light must be coincident with each other. Linearly polarized light out of coincidence is inhibited from being transmitted by the upper polarizer.

Also, by setting the lower optical phase difference film between the transparent touch panel and the liquid crystal display in such a manner that the optical axis of the lower optical phase difference film forms an angle of about 90° to the optical axis of the upper optical phase difference film and moreover forms an angle of about 45° to linearly polarized light that should be outputted from the device surface out of the linearly polarized light emitted from the liquid crystal display, coloring of the display screen, as viewed from the observer side, can be suppressed, by which a display screen which is high in contrast and free from coloring can be obtained. It is noted that linearly polarized light that should be outputted from the device surface, out of the linearly polarized light emitted from the liquid crystal display with a voltage equal to or lower than the threshold voltage, has such a relationship as to form an angle of 90° to the polarization axis of the upper polarizer.

Further, in the touch-input type liquid crystal display device, by applying a lower reflection process to the uppermost surface of the device, reflection of light at the uppermost surface is suppressed.

As a result of these improvements, the liquid crystal display equipped with the transparent touch panel according to the present invention can offer a display screen which reflects less in a room with fluorescent lamps or the like or in outdoor places, is high in contrast, and has very good visibility.

The present invention, by virtue of its constitutions and functions as described above, can provide a touch-input type liquid crystal display device which is high in contrast and high in visibility by virtue of its capability of suppressing reflected light of fluorescent lamps or the like indoors, and reflected light due to external light outdoors by means of the upper polarizer and the individual layers behind the upper polarizer.

Further, in the case where a transparent film is laminated on the upper surface of the upper polarizer, the following advantages are offered by virtue of the transparent film. That is, by the lamination of the transparent film onto the upper surface of the upper polarizer, the surface durability becomes better so that the surface of the upper polarizer can be prevented from being damaged even with pen input or finger input or the like. Also, by the lamination of the transparent film onto the upper surface of the upper polarizer, moisture absorption from the surface of the upper polarizer can be prevented, so that contraction and expansion as well as distortion of the upper polarizer due to the moisture absorption can be suppressed. Therefore, variations of the retardation value of the upper optical phase difference film laminated on the upper polarizer can be suppressed, irregular colors do not occur, and moreover the antireflection function is never impaired.

BRIEF DESCRIPTION OF DRAWINGS

These and other aspects and features of the present invention will become clear from the following description taken in conjunction with the preferred embodiments thereof with reference to the accompanying drawings, in which:

FIG. 19 is an explanatory view for explaining a state in which a portable personal computer having the conventional liquid crystal display device of FIG. 17 is used in a room with a fluorescent lamp or the like.

BEST MODE FOR CARRYING OUT THE INVENTION

Figure 1:
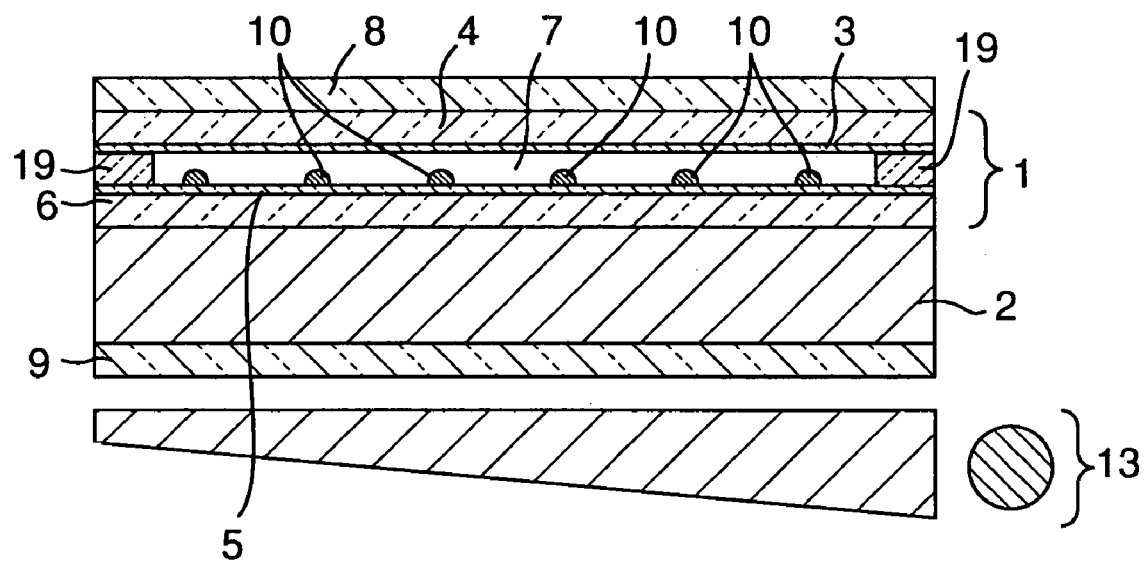
FIG. 1 is a sectional view showing a touch-input type liquid crystal display device (transmission type TN (Twisted Nematic)) according to a first embodiment of the present invention.

Before the description of the present invention proceeds, it is to be noted that like parts are designated by like reference numerals throughout the accompanying drawings.

Hereinbelow, a touch-input type liquid crystal display device, as well as its fabricating method, according to various embodiments of the present invention are described in detail with reference to the accompanying drawings.

Figure 2:
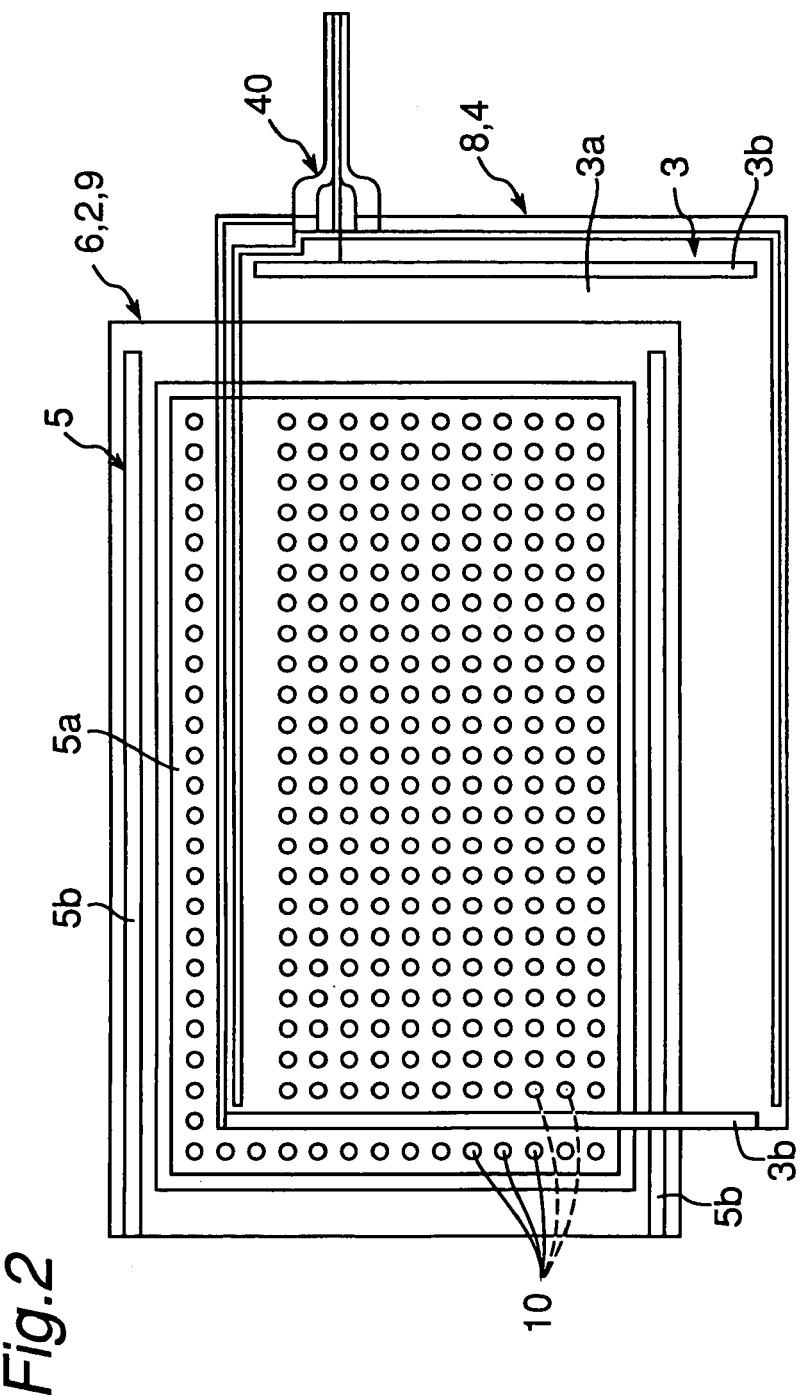
FIG. 2 is an exploded perspective view of the liquid crystal display device of FIG. 1.
Figure 3:
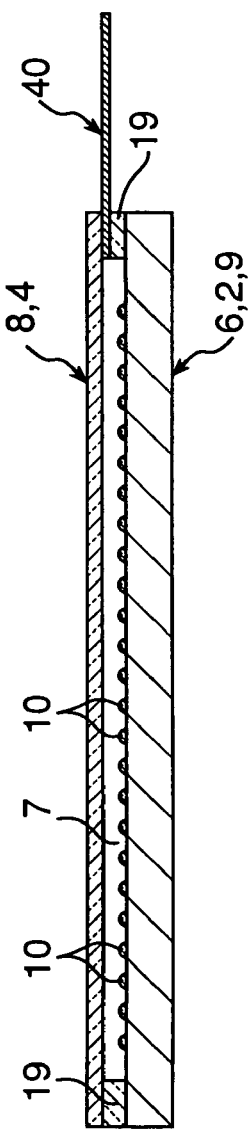
FIG. 3 is a schematic sectional view of the liquid crystal display device of FIG. 1.
Figure 4:
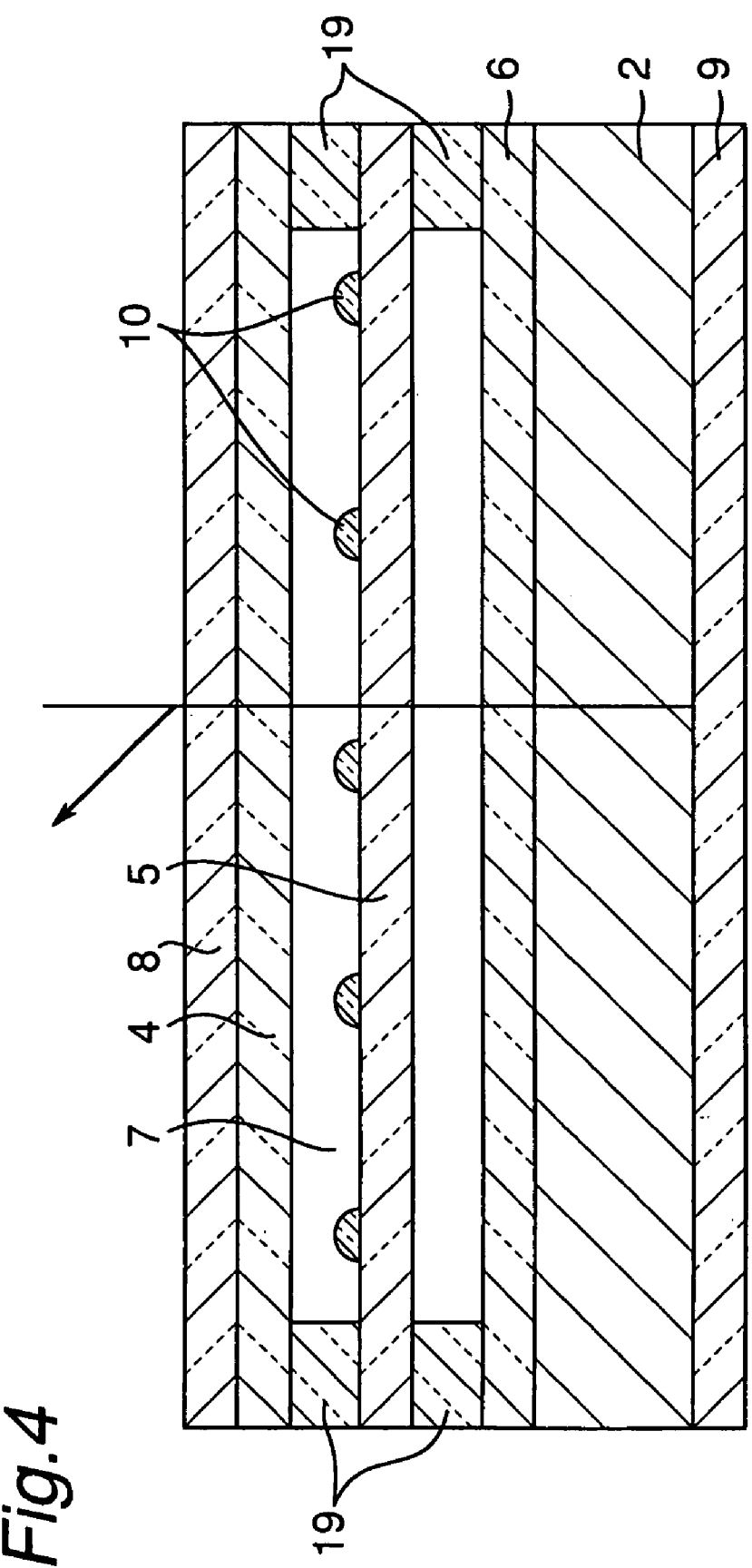
FIG. 4 is an explanatory view for explaining a state in which reflection of external light is suppressed in the liquid crystal display device of FIG. 1.
Figure 5:
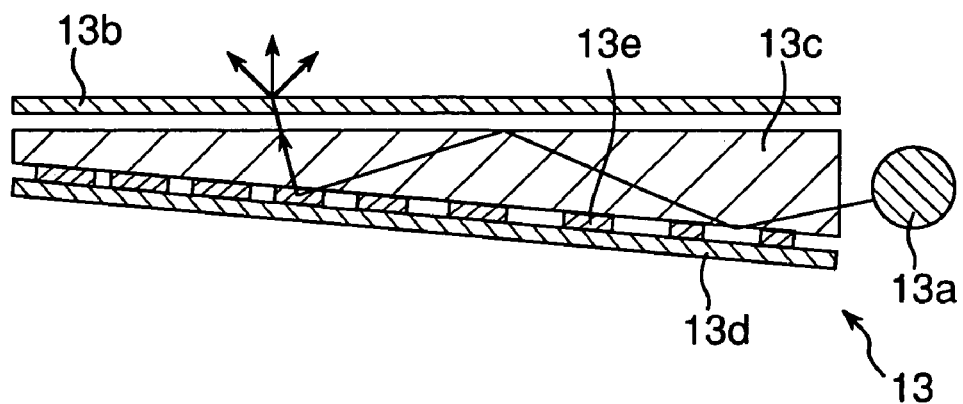
FIG. 5 is an explanatory view of the backlight guide plate.

FIG. 1 is a sectional view showing a touch-input type liquid crystal display device (transmission type TN) of a resistor film type according to a first embodiment of the present invention. FIG. 2 is an exploded perspective view of the liquid crystal display device of FIG. 1, FIG. 3 is a schematic sectional view of the liquid crystal display device of FIG. 1, FIG. 4 is an explanatory view for explaining a state in which reflection of external light is suppressed in the liquid crystal display device of FIG. 1, and FIG. 5 is an explanatory view of the backlight guide plate.

Figure 6:
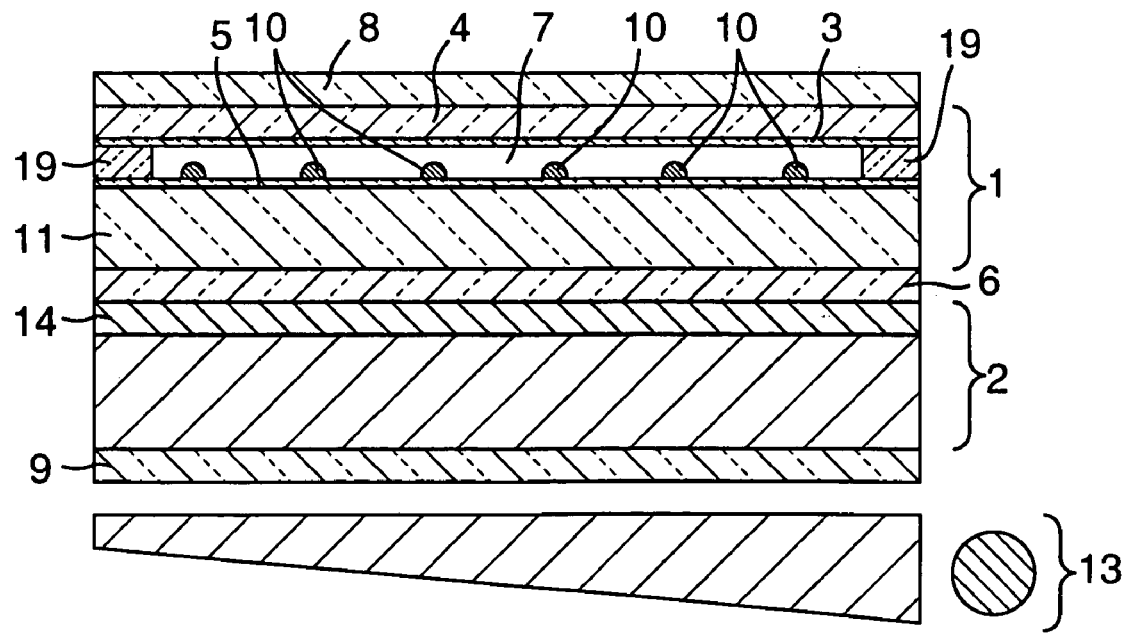
FIG. 6 is a sectional view showing a touch-input type liquid crystal display device (transmission type STN (Super Twisted Nematic)) according to a second embodiment.

Also, FIG. 6 is a sectional view showing a touch-input type liquid crystal display device (transmission type STN) according to a second embodiment of the present invention.

Figure 7:
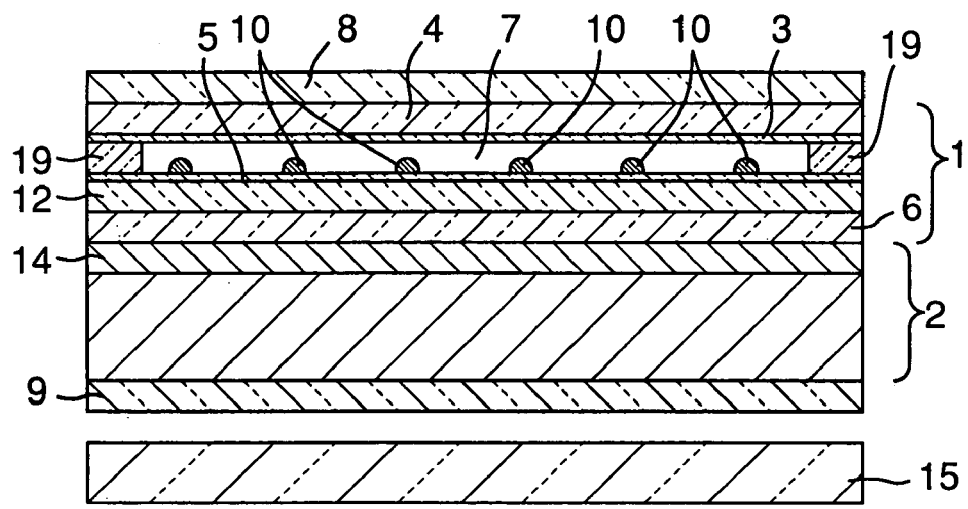
FIG. 7 is a sectional view showing a touch-input type liquid crystal display device (reflection type STN) according to a third embodiment.

FIG. 7 is a sectional view showing a touch-input type liquid crystal display device (reflection type STN) according to a third embodiment of the present invention.

Figure 8:
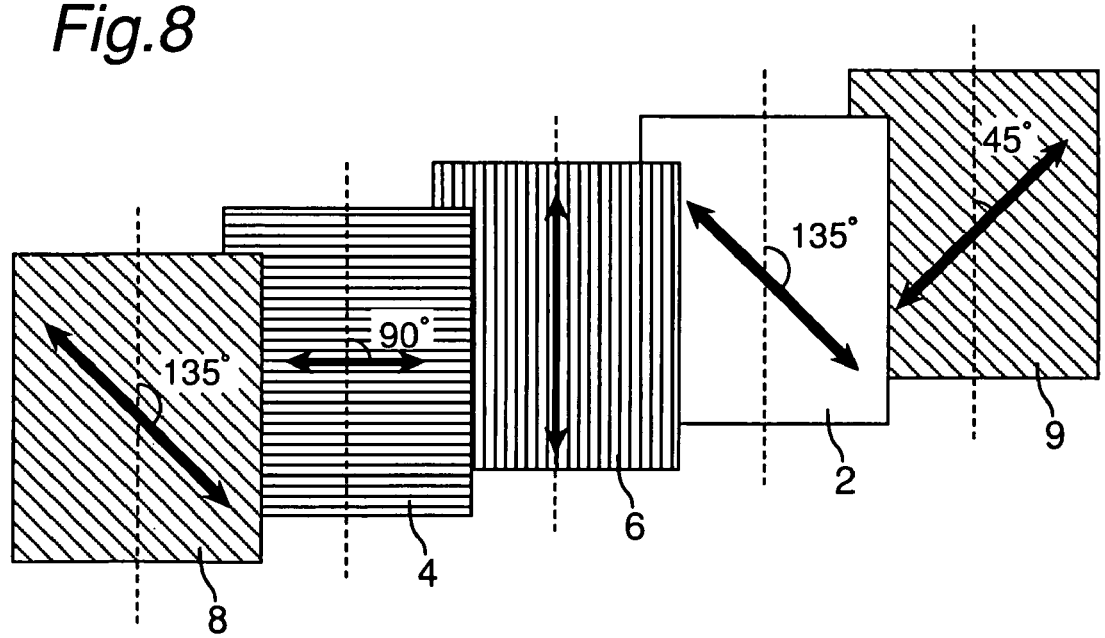
FIG. 8 is an explanatory view of the transmission axis direction and the optical axis direction in the touch-input type liquid crystal display device (TN) according to the foregoing embodiment of the present invention.

FIG. 8 is an explanatory view of the transmission axis direction and the optical axis direction in the touch-input type liquid crystal display device (TN) according to the foregoing embodiment of the present invention.

Figure 9:
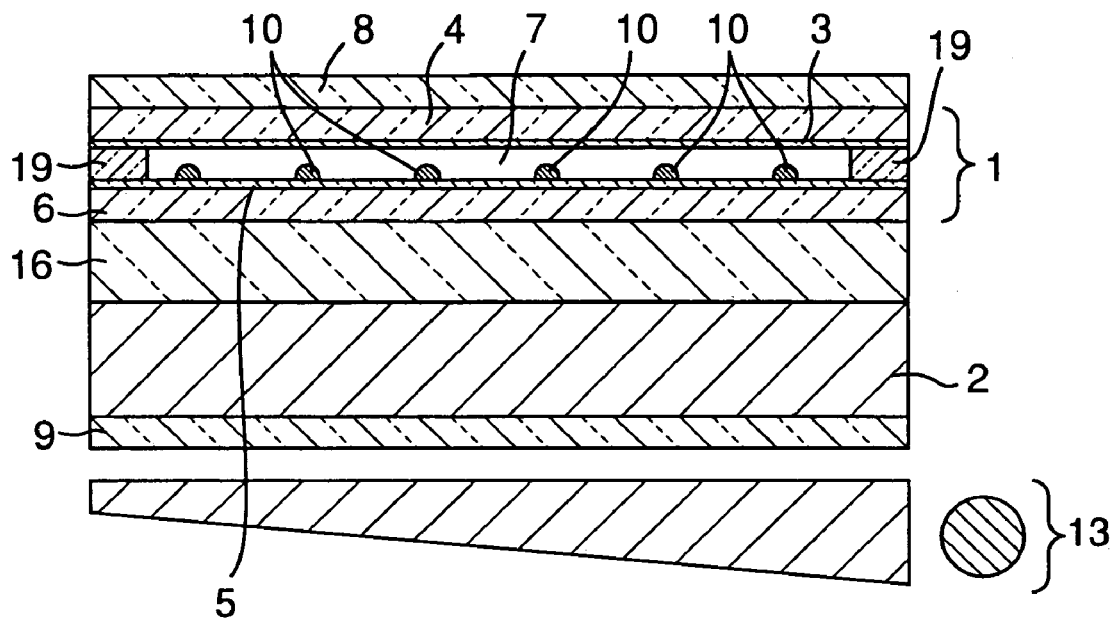
FIG. 9 is a sectional view showing a touch-input type liquid crystal display device (transmission type TN) according to a modification of the first embodiment.

FIG. 9 is a sectional view showing a touch-input type liquid crystal display device (transmission type TN) according to a modification of the first embodiment.

Figure 10:
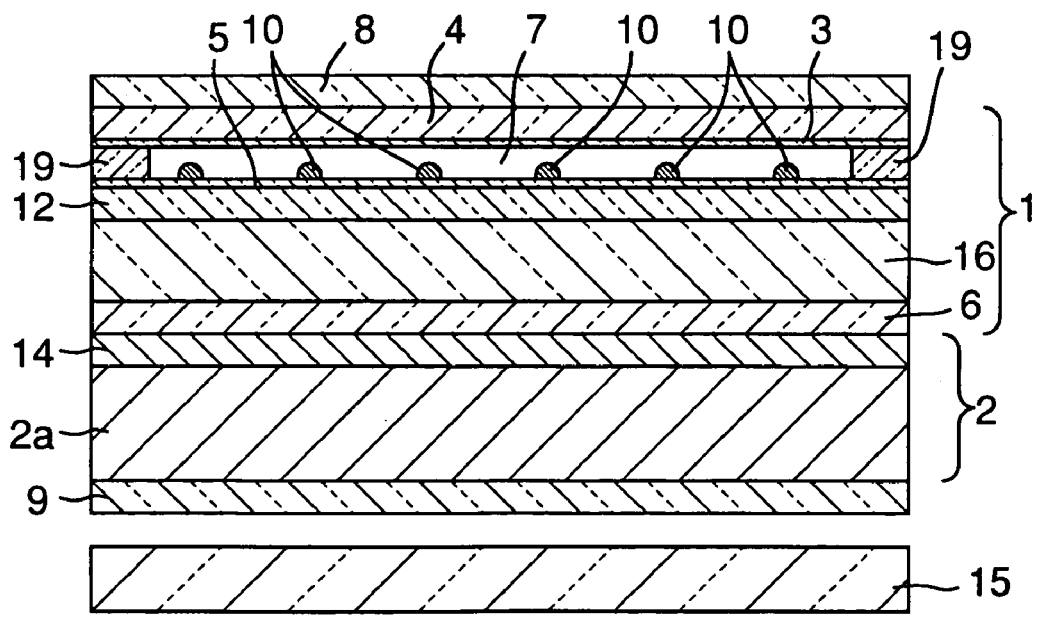
FIG. 10 is a sectional view showing a touch-input type liquid crystal display device (reflection type STN) according to a modification of the third embodiment.

FIG. 10 is a sectional view showing a touch-input type liquid crystal display device (reflection type STN) according to a modification of the third embodiment.

In the figures, reference numeral 1 denotes the transparent touch panel, 2 denotes a liquid crystal display, 3 denotes a movable electrode portion, 4 denotes an upper optical phase difference film, 5 denotes a stationary electrode portion, 6 denotes a lower optical phase difference film, 7 denotes a space layer, 8 denotes an upper polarizer, 9 denotes a lower polarizer, 10 denotes spacers, 11 denotes a glass substrate, 12 denotes an optically isotropic film, 13 denotes a backlight guide plate, 14 denotes an optical-compensation phase difference plate, 15 denotes a reflecting plate, and 16 denotes a transparent resin plate.

An edge-light plane emission device which is a general structure of the backlight guide plate 13 is shown in FIG. 5. In FIG. 5, are shown a line light source 13a, a light guide plate 13c, an light reflecting plate 13d, a light scattering layer 13e, and a diffusion sheet 13b. Light guided from the line light source 13a into the light guide plate 13c is outputted from the front surface (upper surface in FIG. 5) of the light guide plate 13c by the light scattering layer 13e and the light reflecting plate 13d formed on the lower surface of the light guide plate 13c. Further, the light outputted by the light guide plate 13c is plane emitted uniformly overall by the diffusion sheet 13b set on the upper surface of the light guide plate 13c.

The movable electrode portion 3 comprises a transparent electrically conductive film 3a, leads 3b and the like having flexibility. The material of the movable electrode portion 3 is exemplified by metallic oxides such as tin oxide, indium oxide, antimony oxide, zinc oxide, cadmium oxide, or indium tin oxide (ITO), composite films composed primarily of these metallic oxides, gold, silver, copper, tin, nickel, aluminum, palladium, or the like.

The upper optical phase difference film 4 is a transparent film which has a function of changing linearly polarized light into circularly polarized light or generally circularly polarized light by giving a time-base phase shift to two components of polarized light perpendicular to each other resulting from decomposing the linearly polarized light, and a function of delaying the phase of one component of the polarized light by a ¼ wavelength with respect to incident light of a center wavelength of the visible region. That is, by using this upper optical phase difference film 4, one of the two components of polarized light perpendicular to each other resulting from decomposing the linearly polarized light is given a phase delay of a ¼ wavelength of the about 550 nm center wavelength of the visible region, i.e. an about 138 nm phase delay. In this case, if the two components of polarized light perpendicular to each other are equal in amplitude to each other, circularly polarized light results, and otherwise elliptically polarized light results. It is noted here that the description of "about 550 nm center wavelength of the visible region" is only that the center wavelength of the visible region is assumed to be about 550 nm as an example. The reason of the setting to about 550 nm is on the following basis. That is, considering the center wavelength of the visible region in terms of the relation to the human luminosity curve, the human visible region ranges from about 400 nm to 700 nm, a peak of luminosity factor (visual sensitivity) exist-s at about 550 nm. Therefore, suppressing light reflection at wavelengths of this about 550 nm can make reflection-insensible to the human eyes.

The upper optical phase difference film 4 also fulfills a function as a pen or finger input of the touch panel, and so it needs to have flexibility for easier input operation.

Also, because the upper optical phase difference film 4 is high-temperature-treated during the formation of the movable electrode portion 3 and the circuit formation, the film material used is required to have a thermal resistance of 150° C. or more. In the case of film-materials having lower thermal deformation temperatures (i.e., less than 150° C. as will be described later), the retardation value, which is a value of phase delay between the two components of polarized light, would be changed by high temperature treatment, in which case the visibility of the display screen would be inferior with the constitution of the touch-input type liquid crystal display device according to this embodiment of the present invention. However, it has been found that the higher the thermal deformation temperature (i.e., 150° C. or more as will be described later) of the film material is, the smaller the change of the retardation value in high temperature treatment becomes practically negligibly. Such a material is exemplified by uniaxial oriented polymeric films having a thermal deformation temperature of 150° C. or more, e.g., polyarylate, polyethersulfone, norbornene base resins, polysulfone, and the like. Particularly, uniaxial oriented polyarylate, polyethersulfone, or polysulfone films having a thermal deformation temperature of 170° C. or more are preferable as the film material.

The reason because a film material having a 150° C. or more thermal deformation temperature is used as the film material for the upper optical phase difference film 4, as well as the reason because the film material preferably has a 170° C. or more thermal deformation temperature, as shown above, are described below in detail.

The reason a film material having a 150° C. or more thermal deformation temperature is used as the film material for the upper optical phase difference film 4 is described below.

Generally, when heat equal to or higher than the thermal deformation temperature of the film material of the upper optical phase difference film 4 is applied to the film material of the upper optical phase difference film 4, the film material of the upper optical phase difference film 4 shows such deterioration as deformation or distortion due to the heat. In such a case, it becomes hard for the upper optical phase difference film 4 to retain the ¼ wavelength phase difference (retardation), thus no longer possible to suppress the reflection or obtain a correct image. Therefore, by the temperatures of later-described heat treatments to be performed on the upper optical phase difference film 4 in this embodiment, usable film materials are limited.

In addition, with a low thermal deformation temperature (e.g., less than 150° C.) of the film material of the upper optical phase difference film 4, performing the heat treatment at temperatures less than the low thermal deformation temperature would also inhibit occurrence of deformation or deterioration of the film material of the upper optical phase difference film 4 due to the heat. In such a case, however, the heat treatment would be useless as a matter of course, that is, various effects of the heat treatment as will be described later could no longer be obtained.

Heat treatment in fabricating the upper optical phase difference film 4 is now described in a process sequence, that is, from heat treatment (1) to heat treatment (3) below:

Heat Treatment (1):

Normally, the upper optical phase difference film 4 for the liquid crystal display device is fabricated in multiplicities in succession. Therefore, the film material is prepared in the form of a roll in which one sheet of film material corresponding to one sheet or any arbitrary sheets of upper optical phase difference film 4 is coupled one after another continuously.

Before a transparent electrically conductive film to form part of the movable electrode portion 3 is formed on such a rolled film material, the film material needs to be subjected to heat treatment for a specified time period at as high temperatures as possible in order to eliminate residual solvents contained in the film material. This is because the presence of any residual solvents in the film material would make it impossible to stably form the transparent conductive film. Therefore, in order to form a transparent conductive film having superior stability and high strength on the film material after eliminating residual solvents contained in the film material, it is necessary to perform the heat treatment for removing the residual solvents for a specified time period under a high temperature of 150° C. or more before depositing a transparent conductive film on the film material. As for the reason of this, the residual solvents could not be removed enough under temperatures of less than 150° C. so that a transparent conductive film having superior stability and high strength could absolutely not be formed on the film material. Accordingly, for the purpose of removing the residual solvents in the film material, the film material, that is, the upper optical phase difference film 4 is required to have a thermal deformation temperature of 150° C. or more.

Heat Treatment (2):

After the transparent conductive film is formed on the film material as described above, in order that a desired circuit to be connected to the already deposited transparent conductive film is formed on the rolled film material, first, the rolled film material is cut into a sheet form, thus providing film material sheets for use as the upper optical phase difference film 4. Then, this film material sheet is subjected to heat treatment process, as required, for reducing dimensional errors in circuit formation as much as possible. This heat treatment process is desirably performed at a temperature not less than 100° C. and less than 130° C. for about 1 hour. Therefore, the film material is required to have a thermal deformation temperature of not less than 130° C., preferably and sufficiently not less than 150° C.

Heat Treatment (3):

During the circuit formation on the film material sheet, high temperature drying process is performed for the curing of the binder of the ink with which the desired circuit to be connected to the transparent conductive film has been formed, as well as for the removal of the solvents. This high temperature drying process is performed at a temperature not less than 100° C. and less than 150° C. for 30-60 minutes. Therefore, the film material is required to have a thermal deformation temperature of not less than 150° C.

Since the various heat treatment processes, heat treatment (1) to (3), are performed as shown above, the film material of the upper optical phase difference film 4 is a uniaxial oriented polymeric film having a thermal deformation temperature of 150° C. or more, exemplified by polyarylate, polyethersulfone, polysulfone, norbornene base resins, or the like. Particularly preferable as the film material are uniaxial oriented polyarylate, polyethersulfone, polysulfone, or the like having a thermal deformation temperature of 170° C. or more. Indeed a film material having a thermal deformation temperature of 150° C. or more can be subjected to the various heat treatment processes enough as described above, but heat treating the film material to 170° C. or more before the formation of the transparent conductive film makes the transparent conductive film sufficiently crystallized (which means a high strength), which allows an even more stable transparent electrode to be obtained. For executing the in heat treatment to 170° C. or more, the film material is also required to have a thermal deformation temperature not less than the heat treatment temperature, 170° C.

Also, the film thickness of the upper optical phase difference film 4 is preferably not less than 50 µm and not more than 150 µm. If the thickness of the upper optical phase difference film 4 is over 150 µm, the total thickness in combination with the upper polarizer 8 would be so large that input by finger or pen would feel heavy with neat input of characters disabled. Besides, if the thickness of the upper optical phase difference film 4 is less than 50 µm, the film itself would be poor in toughness and yield film wrinkles or corrugations during the circuit formation, so that lamination with the upper polarizer 8 would be difficult. Therefore, the thickness of the upper optical phase difference film 4 is preferably not less than 50 µm and not more than 150 µm, more preferably not less than 75 µm and not more than 125 µm. As for the reason that the thickness of the upper optical phase difference film 4 is more preferably not less than 75 µm and not more than 125 µm, if the thickness is not less than 50 µm and less than 75 µm, the film would be tough and free from occurrence of wrinkles, but it would be impossible to completely eliminate corrugations having gently-sloping crests and troughs. With a thickness of 75 µm or more, the upper optical phase difference film 4 is enabled to completely eliminate the corrugations. Furthermore, indeed films having a thickness of not less than 125 µm and less than 150 µm indeed allow pen or finger input to feel light with neat input of characters enabled, but films thinner than 125 µm allow particularly neat character input to be realized.

Also, a member 19 depicted in FIGS. 1, 6, 7, 9, 10 is a double-sided tape 19 for bonding the upper optical phase difference film 4 that supports electrode 3, and a base material that directly forms the stationary electrode portion 5 thereon around the space layer 7 sandwiched between the movable electrode 3 and the stationary electrode 5. An adhesive material may substitute for the double-sided tape 19. The adhesive material or the adhesive compound used for the double-sided tape 19 may be acrylic-, epoxy-, urethane-based material or compound, or their copolymers or the like, while the double-sided tape is appropriately, for example, Nitto Denko Kabushiki Kaisha's 532 or the like.

The stationary electrode portion 5 comprises a transparent conductive film 5a, a lead 5b, and the like, like the movable electrode portion 3. The material for forming the stationary electrode portion 5 is exemplified by oxides such as tin oxide, indium oxide, antimony oxide, zinc oxide, cadmium oxide, or indium tin oxide (ITO), composite films composed primarily of these metallic oxides, gold, silver, copper, tin, nickel, aluminum-, palladium, or the like.

As the base material for directly forming the stationary electrode portion 5 thereon, the lower optical phase difference film 6 (see FIG. 1) is used in the first embodiment.

In contrast to this, in the second embodiment, the transparent glass substrate 11 having optical isotropy (see FIG. 6) is used as the base material for directly forming the stationary electrode portion 5 thereon.

Also, in the third embodiment, the transparent optically isotropic film 12 (see FIG. 7) is used as the base material for directly forming the stationary electrode portion 5 thereon.

The base material in both the second embodiment and the third embodiment is high-temperature-treated during the formation of the stationary electrode portion 5 and the circuit formation, as in the upper optical phase difference film 4.

Characteristics required as the material of the lower optical phase difference film 6 differ between a case where the transparent conductive film that forms part of the stationary electrode portion 5 is provided on the lower optical phase difference film 6 as in the first embodiment, and another case where the transparent conductive film that forms part of the stationary electrode portion 5 is not provided on the lower optical phase difference film 6 as in the second and third embodiments. Therefore, the characteristics are described below separately for the cases.

First, in the case where the transparent conductive film that forms part of the stationary electrode portion 5 is provided on the lower optical phase difference film 6 as in the first embodiment, i.e., where the stationary electrode portion 5 including the transparent conductive film is directly formed on the lower optical phase difference film 6, the following characteristics are required.

The material of the lower optical phase difference film 6 is exemplified by uniaxial oriented transparent polymeric films having a thermal deformation temperature of 150° C. or more, for example, polyarylate, polyethersulfone, polysulfone, norbornene base resins, or the like. The reason of this is that with the thermal deformation temperature less than 150° C., there would occur a change in retardation at visible portions of the liquid crystal display of the touch panel due to the heat treatment during the fabrication of the touch panel, so that the low reflection effect could no longer be obtained enough. Another reason is that light necessary for making up pixels could not be outputted because of retardation changes, or light unnecessary for making up the pixels would be outputted, so that a correct image could not be formed. The aforementioned heat treatment to be executed on the lower optical phase difference film 6 on which the stationary electrode portion 5 is directly formed refers to the heat treatment (1) to (3) as mentioned for the upper optical phase difference film 4. Also, the material of the lower optical phase difference film 6 preferably has a thermal deformation temperature of 170° C. or more in terms of sufficiently crystallizing the transparent conductive film, as in the case of the upper optical phase difference film 4.

Next, in the case where the transparent conductive film is not provided on the lower optical phase difference film 6 as in the second and third embodiments, that is, where the stationary electrode portion 5 including the transparent conductive film is formed on the glass substrate 11 having optical isotropy as in the second embodiment, or where the stationary electrode portion 5 including the transparent conductive film is formed on the optically isotropic film 12 as in the third embodiment, the following characteristics are required.

The material of the lower optical phase difference film 6 on which the transparent conductive film is not provided is exemplified by uniaxial oriented transparent polymeric films having a thermal deformation temperature of 130° C. or more, for example, polycarbonate, polyarylate, polyethersulfone, norbornene base resins, polysulfone, or the like. In this case, the heat treatment (1) to (3) as discussed in association with the fabrication of the upper optical phase difference film 4 are not involved, the lower optical phase difference film 6 does not need to have a thermal deformation temperature of 150° C. or more. However, it is still necessary for the lower optical phase difference film 6 to have a thermal deformation temperature of 130° C. or more.

This is because a thermal deformation temperature of less than 130° C. might cause the retardation value to change with time.

Meanwhile, as the optically isotropic film 12 that forms the stationary electrode portion 5, un-drawn polymeric films having a thermal deformation temperature of 150° C. or more, for example, polyarylate, polyethersulfone, polysulfone, norbornene base resins, or the like are preferable. As for the reason of this, whereas the optically isotropic film 12 indeed has no phase difference value and no problem in this respect, the optically isotropic film 12 is subjected to the respective heat treatment (1) to (3) as described in the fabrication of the upper optical phase difference film 4 and therefore needs to have such a thermal deformation temperature of 150° C. or more as the optically isotropic film 12 can endure those processes.

As described above, in the first and third embodiments, with the use of the lower optical phase difference film 6 and the optically isotropic film 12, the total thickness of the transparent touch panel 1 becomes thinner, making it possible to provide a thinner, more lightweight touch-input type liquid crystal display device, as compared with the case where the glass substrate 11 having optical isotropy is used in the second embodiment. For example, in the case of the second embodiment where the stationary electrode portion 5 is formed on the glass substrate 11 having optical isotropy, in the case of the first embodiment where the lower optical phase difference film 6 is used or the third embodiment where the optically isotropic film 12 is used, the glass substrate 11 having optical isotropy can be made 0.7 mm thick, while the lower optical phase difference film 6 or the optically isotropic film 12 can be made 0.075 mm thick, and the base material for the stationary electrode of the first embodiment or the third embodiment is about one tenth as thick as that of the second embodiment. Meanwhile, with the use of the glass substrate 11 having optical isotropy as in the second embodiment, pressing stability and durability of the finger or pen becomes more stable, as compared with the first embodiment or the third embodiment.

Also, as a modification of the first embodiment, if pressing stability and durability equivalent to those of the glass substrate 11 having optical isotropy are preferred to the thinness in the first embodiment, the transparent resin plate 16 having optical isotropy may appropriately be disposed between the transparent touch panel 1 and the liquid crystal display 2 (see FIG. 9).

Also, as a modification of the third embodiment, if pressing stability and durability equivalent to those of the glass substrate 11 having optical isotropy are preferred to the thinness in the third embodiment as well, the transparent resin plate 16 having optical isotropy may appropriately be disposed between the optically isotropic film 12 and the lower optical phase difference film 6 (see FIG. 10).

As the material of the transparent resin plate 16 having optical isotropy in the aforementioned respective modifications, resins superior in transparency such as polycarbonate resins, acrylic resins or polystyrene resins are used. The thickness of the transparent resin plate 16 having optical isotropy is, for example, 0.3-5.0 mm. With a thickness less than 0.3 mm, the transparent resin plate 16 would deteriorate in pressing stability and durability and therefore would be prone to yield recesses or other deformations due to repeated inputs. Also, with a thickness over 5.0 mm, the transparent resin plate 16 would be heavier than glass, impracticable as portable equipment.

Furthermore, a multiplicity of spacers 10 are formed between the movable electrode portion 3 and the stationary electrode portion 5 which are opposed to each other. Thus, input is effected by pressing from on the upper optical phase difference film 4 with a finger or pen and thereby causing the movable electrode portion 3 to come into contact with the stationary electrode portion 5 in regions where the spacers 10 are absent.

In addition, the spacers 10 in the figures are exaggeratedly depicted for an easier understanding, whereas the spacers 10 are actually difficult to discern by the eyes. As an actual example, the height of each spacer 10 is 1-15 μm, the outer diameter of the cylinder, which is each spacer 10, is 30-100 μm, and the spacers 10 are arrayed at intervals of a fixed value between 0.1 mm-10 mm.

Whereas the upper polarizer 8 is disposed on the upper surface of the upper optical phase difference film 4, the polarization axis of the upper polarizer 8 is set with an inclination of about 45° with respect to the optical axis of the upper optical phase difference film 4. The angle of about 45° is intended to convert linearly polarized light into circularly polarized light or generally circularly polarized light, where an allowance of up to ±3° is permitted. With such an arrangement, the two components of polarized light perpendicular to each other become equal in amplitude to each other, so that the linearly polarized light having passed through the upper optical phase difference film 4 is formed into circularly polarized light or generally circularly polarized light.

Here is described the reason that the polarization axis of the upper polarizer 8 is permitted to be 45° with an allowance of ±3° with respect to the optical axis of the upper optical phase difference film 4.

Unless the polarization axis of the upper polarizer 8 is set so as to accurately form an angle of 45° with respect to the optical axis of the upper optical phase difference film 4, linearly polarized light that has been incident on the upper optical phase difference film 4 is not changed into circularly polarized light but formed into elliptically polarized light.

Thereafter, the circularly polarized light that has been returned by reflection passes again through the upper optical phase difference film 4, being outputted as linearly polarized light from the upper surface of the upper optical phase difference film 4, while the elliptically polarized light that has been returned by reflection is outputted as elliptically polarized light close to linearly polarized light from the upper surface of the upper optical phase difference film 4. Complete linearly polarized light then perpendicularly crosses the transmission axis (like a slit) of the upper polarizer 8, not being outputted from the upper surface of the upper polarizer 8, so that reflected light can be suppressed. Incomplete linearly polarized light, on the other hand, can block the component perpendicular to the transmission axis of the upper polarizer 8 from being outputted, but allows the component coincident with the transmission axis of the upper polarizer 8 to be outputted from the upper surface of the upper polarizer 8. That is, excess reflection remains.

Even if the polarization axis of the upper polarizer 8 is not accurately at the angle of 45° with respect to the optical axis of the upper optical phase difference film 4, but only if the difference is within ±3°, then the result is almost the same as with the circularly polarized light (i.e., generally circularly polarized light) and the reflected light outputted from the upper surface of the upper polarizer 8 (top surface of the liquid crystal display device) can be finally neglected.

Next, the material of the upper polarizer 8 is generally a flexible, 200 μm thick polarizer which is obtained by impregnating polyvinyl alcohol with a dichroic pigment such as iodine or dye, and drawing it, and then covering the front and rear surfaces with a cellulose-base protector film such as triacetylcellulose. Such an upper polarizer 8 is exemplified by "HEG1425DU made by Nitto Denko Kabushiki Kaisha".

Also, a low-reflection processed layer may be formed on the upper surface of the upper polarizer 8 by applying a low reflection process thereto. The low reflection process may be done by applying a low-reflection material using a low-refractive-index resin such as fluororesin or silicon resin, or forming a metallic multilayer film or laminating a low-reflection film. It is noted here that out of the total reflection of a touch-input type liquid crystal display device, reflection by the touch panel surface accounts for about 4%, and that the process for suppressing this reflection to less than 1% is called the low reflection process.

In order to protect the upper polarizer 8 and the upper optical phase difference film 4 from wearing due to press by finger or pen, a hard coat processed layer comprising acrylic resin, silicon resin, UV curing resin, or the like may also be deposited on the upper polarizer 8.

By arranging the transparent touch panel 1 and the upper polarizer 8 in such a constitution as shown above, reflected light due to the externally incident light can be suppressed in the following manner.

Incident light from the observer side passes through the upper polarizer 8, becoming linearly polarized light. When this linearly polarized light passes through the upper optical phase difference film 4 that gives a ¼ wavelength phase delay to the center-wavelength incident light whose optical axis is inclined by about 45° to the polarization axis of the upper polarizer 8, the linearly polarized light is divided into two polarized components perpendicular to each other and equal in amplitude to each other, one polarized component being given a ¼ wavelength phase delay. As a result, the linearly polarized light is changed into circularly polarized light or generally circularly polarized light. Then, the circularly polarized light or generally circularly polarized light reflected by an interface between the space layer 7 and the stationary electrode portion 5, which is the largest refractive index portion of the interface, passes again through the upper optical phase difference film 4. The light having passed through the upper optical phase difference film 4 is changed from circularly polarized light or generally circularly polarized light into linearly polarized light, where the linearly polarized light changes 90° to the linearly polarized light that has first passed through the upper polarizer 8, resulting in linearly polarized light nearly vertical to the transmission axis of the upper polarizer 8, so that light no longer passes through. Thus, reflected light is suppressed.

The term, "generally circularly-polarized light", herein referred to is in a state very close to circularly polarized light. When the optical axis of the upper optical phase difference film 4 is angled 45° to the polarization axis of the upper polarizer 8, circularly polarized light results, and otherwise, elliptically polarized light results. Since the upper polarizer 8 and the upper optical phase difference film 4 are disposed with an allowance of ±3° with respect to the angle in the present embodiments of the present invention, the terms, "generally circularly polarized light", in the citation, "elliptically polarized light or generally circularly polarized light" is elliptically polarized light within the allowance range of ±3°.

In addition, the optical axis of the upper optical phase difference film 4 is an axis parallel to the drawing direction of the film material of the upper optical phase difference film 4, which is used as the raw material.

Also, the polarization axis (or absorption axis) of the upper polarizer 8 is an axis parallel to the drawing direction of the film material. Light passing through the upper polarizer 8 is polarized so as to be outputted from the upper polarizer 8 as linearly polarized light only in the direction perpendicular to the absorption axis.

It is noted that an axis perpendicular to the absorption axis is referred to as a transmission axis. In order for linearly polarized light to be transmitted by this upper polarizer 8, the transmission axis and the direction of the light must be coincident with each other. Linearly polarized light out of coincidence in directions cannot be transmitted by the upper polarizer 8.

Linearly polarized light emitted from the liquid crystal display 2 is originally light from the backlight, which is changed into linearly polarized light by a polarizer (lower polarizer in this case) as stated above, then by passing through the liquid crystal display 2, outputted so as to be coincident with the transmission axis of the upper polarizer 8 with a voltage below a threshold voltage or outputted so as not to be coincident with the transmission axis of the upper polarizer 8 with a voltage equal to or above the threshold voltage, for example, in the case of the normally white display mode. In addition, in the case of the normally black display mode, conversely, the light is outputted so as to be coincident with the transmission axis of the upper polarizer 8 with a voltage over the threshold voltage, and outputted so as not to be coincident with the transmission axis of the upper polarizer 8 with a voltage equal to or below the threshold voltage.

Like the polarization axis of the upper polarizer 8, the polarization axis (or absorption axis) of the lower polarizer 9 is an axis parallel to the drawing direction of the film material. Light passing through the lower polarizer 9 is polarized so as to be outputted from the lower polarizer 9 as linearly polarized light only in the direction perpendicular to the absorption axis.

Also, in order to suppress coloring of the display screen of the liquid crystal display device as viewed from the observer side, a lower optical phase difference film 6 that gives a ¼ wavelength phase delay to the center-wavelength incident light is disposed between the upper optical phase difference film 4 and the liquid crystal display 2 of the transparent touch panel 1. More preferably, when the lower optical phase difference film 6 is laminated on the entire upper surface of the liquid crystal display 2 by the medium of a transparent adhesive or the like, not only the coloring of the display screen can be suppressed but also reflected light can be suppressed more effectively.

In this case, the lower optical phase difference film 6 is so positioned that the optical axis of the upper optical phase difference film 4 and the optical axis of the lower optical phase difference film 6 forms an angle of about 90°. The angle of about 90° is intended to change the circularly polarized light or generally circularly polarized light, which results after passing through the lower optical phase difference film 6, into linearly polarized light with the upper optical phase difference film 4, where an allowance of ±3° is permitted.

Further, the lower optical phase difference film 6 is so positioned that the optical axis of the lower optical phase difference film 6 is angled about 45° with respect to linearly polarized light that should be outputted from the device surface out of the linearly polarized light emitted from the liquid crystal display 2. The angle of about 45° is intended to change the linearly polarized light into circularly polarized light or generally circularly polarized light, where an allowance of ±3° is permitted. In addition, in the case of the lower optical phase difference film 6 in which the stationary electrode portion 5 is provided on its upper surface, coloring of the display screen can be suppressed and, because the lower optical phase difference film 6 also forms part of the transparent touch panel 1, there is no need of providing the optical phase difference film. Besides, the linearly polarized light that should be outputted from the device surface out of the linearly polarized light emitted from the liquid crystal display 2 with a voltage equal to or below the threshold voltage has such a relationship with the polarization axis of the upper polarizer 8 as to form an angle of 90°.

As the liquid crystal display system to be used for the liquid crystal display 2, available are transmission- and reflection-type TN liquid crystal display systems, transmission- and reflection-type STN display systems, and the like. In any case of these liquid crystal display systems, the lower optical phase difference film 6 may appropriately be positioned so that the optical axis of the lower optical phase difference film 6 forms an angle of about 45° with respect to linearly polarized light that should be outputted from the device surface out of the linearly polarized light emitted from the liquid crystal display 2.

In the cases of the transmission- and reflection-type STN liquid crystal display systems, as the constitution of the liquid crystal display 2, an optical-compensation phase difference plate 14 for preventing the coloring of the display screen and enhancing the contrast is generally provided on top of the liquid crystal cell 2a in addition to a liquid crystal cell 2a, as shown in FIG. 10.

In the case of general TN liquid crystal display, light outputted from the backlight guide plate 13, passing through the polarizer 9, results in linearly polarized light as shown in FIG. 8. This linearly polarized light, when passing through the liquid crystal display 2 with a voltage equal to or below the threshold voltage, results in linearly polarized light twisted 90°. Further, linearly polarized light that has passed through the lower optical phase difference film 6 becomes circularly polarized light and then returned again to linearly polarized light by the upper optical phase difference film 4. At this time point, because the angle between the optical axes of the two optical phase difference films is about 90°, the resulting linearly polarized light is directed so as to be perpendicular to the polarization axis of the upper polarizer 8 in the case of the normally white display mode. That is, the linearly polarized light is coincident with the transmission axis. Therefore, this linearly polarized light is allowed to pass through the polarizer 8 so that light can reach the observer.

Also, in the touch-input type liquid crystal display device having a constitution as described above, the member on which the stationary electrode portion 5 is directly formed, as well as the liquid crystal display 2, or these members as well as all the members between these members indeed may be bonded by double-sided adhesive tapes at places outside the display screen area, but more preferably, bonded overall by a transparent adhesive layer or a transparent re-peel sheet. In addition, all the members may be bonded to one another only by either one of transparent adhesive layer and transparent re-peel sheet, and it is also possible that some members are bonded by a transparent adhesive layer while other members are bonded by a transparent re-peel sheet.

The transparent adhesive layer is a coating of a general transparent adhesive. This adhesive is exemplified by acrylic resins such as acrylic ester copolymers, urethane resins, silicon resins, or rubber base resins. The transparent re-peel sheet is a gel sheet formed from a transparent polymeric adhesive. The polymeric adhesive is exemplified by urethane, acrylic, natural polymeric materials, or the like. By the transparent adhesive layer or the transparent re-peel sheet, the air space between the member on which the stationary electrode portion 5 is directly formed, and the liquid crystal display 2 can be eliminated. Still more, because the refractive index of these transparent adhesive layer and the transparent re-peel sheet is larger than air, close to the refractive indices of such members as the lower optical phase difference film 6, the glass substrate 11 having optical isotropy, the optically isotropic film 12, the transparent resin plate 16 having optical isotropy, the glass plate forming the liquid crystal display 2, and the like, the reflection of light at the interfaces between the transparent adhesive layer or the transparent re-peel sheet and these members is suppressed, so that the transmittance finally becomes higher than that of a constitution having an air space in the case where double-sided tape is used. Besides, because the refractive index of the transparent adhesive layer or the transparent re-peel sheet is close to the refractive indices of the above-mentioned members, refraction of light at the interface between the transparent adhesive layer or the transparent re-peel sheet and the members is suppressed, so that no shadows are formed in the screen display.

Also, the members bonded to each other by the transparent re-peel sheet are characterized by being highly resistant to a vertically-acting pull-away force and a horizontally-displacing force, and easily being separated away from each other when pulled away from both sides in such a manner that the members are peeled off from their ends. Accordingly, there is no expectation of peels during use of the members after the mounting, so that the members can easily be peeled off for maintenance or other occasions. In addition, it is needless to say that the adhesive power of the transparent re-peel sheet does not lower even after repeated removals. Also, in the case where an urethane base polymeric adhesive is used, because the transparent re-peel sheet is a material having both water absorbing and gas sucking properties, the transparent re-peel sheet, when fitted, absorbs the air bubbles mixed between the members at room temperature, so that a product free from air bubbles can finally be obtained without any special treatment. In addition, the terms, any special treatment, refer to such treatment as expelling air bubbles by moving a roll while a pressure is applied from an end portion of the surface of the transparent touch panel 1. Such a special treatment cannot be applied in the case of a transparent touch panel 1 using the glass substrate 11 having optical isotropy, in which case the aforementioned air bubble absorbing effect at room temperature is quite useful.

Next, the method for fabricating the touch-input type liquid crystal display device is described in detail below.

(Upper Optical Phase Difference Film 4 of Touch Panel 1)

The upper optical phase difference film 4 can be given a specified phase difference by uniaxial-orienting an un-drawn film material. In this embodiment, a rolled film material having a phase difference of ¼ wavelength in visible light of about 550 nm, which is an example of the wavelength of the largest luminosity factor, by controlling a refractive index in an x-direction, which is the optical axis direction of the film material, a refractive index in a y-direction perpendicular to the x-direction, and a refractive index in a thickness direction of the film material, which is a z-direction perpendicular to the x-direction and the y-direction, and the resultant film material is used for the upper optical phase difference film 4. In addition, when the lower optical phase difference film 6 is given phase difference, the case is the same as in the upper optical phase difference film 4.

(Movable Electrode Portion 3 of Touch Panel 1)

A transparent conductive film forming part of the movable electrode portion 3 is formed on the rolled film material for use of the upper optical phase difference film 4. Processing of this film formation may be performed via sputtering, evaporation, or a CVD process. Before the formation of the transparent conductive film, high temperature treatment needs to be carried out as much as possible in order to remove the residual solvents in the film material. This is because the residual solvents, if present, would make it impossible to form a stable transparent conductive film. Whereas the transparent conductive film is deposited after the removal of residual solvents, it is necessary to form the film under a temperature of 150° C. or more for stabler formation and higher strength of the transparent conductive film. Accordingly, a film material having a thermal deformation temperature of less than 150° C. would yield such deteriorations as deformation and distortion with 150° C. or more heat, so that the ¼ wavelength phase difference could not be retained. Also, heat treatment of less than 150° C. would result in insufficient removal of the residual solvents, so that a stable, high-strength transparent conductive film could not be obtained. Therefore, since 150° C. or more heat treatment is done for the removal of residual solvents in the film material, the film material for forming the transparent conductive film must be a film material having a thermal deformation temperature of 150° C. or more.

The film material with a transparent conductive film for use of the upper optical phase difference film 4 made in this way is generally roll-shaped. Therefore, the film material is cut into specified size for circuit formation so as to be formed into sheet-like film material. It is noted that one film material sheet, in some cases, corresponds to one transparent touch panel 1, but without being limited to this, corresponds to any arbitrary number of transparent touch panels 1 in other cases.

The cut film material sheet is subjected to a heating process, as required, to reduce any dimensional errors in circuit formation. The heating process is desirably done at a temperature of not less than 100° C. and less than 130° C. for about 1 hour. Thereafter, the circuit formation of leads and the like which are parts of the rest of the movable electrode portion 3 is carried out. The process for the circuit formation may be done by screen printing, offset printing, roll coater, dispenser, or the like. As the ink used for the circuit formation, ink in which metal microparticles having electrical conductivity have been dispersed in a binder made of thermosetting resin is used, and a solvent is added thereto for better printability so that the viscosity is adjusted. As the metal microparticles used for the conductive ink, silver, nickel, copper, gold, or the like is used. High temperature drying process is performed for the curing of the binder and the removal of solvents. The drying process is done at a temperature of not less than 100° C. and less than 150° C. for 30-60 minutes. Drying conditions are adjusted according to the ink used. Needless to say, a film material whose phase difference of ¼ wavelength is not changed by the heat treatment during the circuit formation is previously selected.

When the circuit formation is done in a multiple pattern (i.e., a pattern of providing several touch panels) with respect to one film material sheet, then large quantities of circuit formed films can be fabricated, efficiently.

In the cutting of the rolled film and in the circuit formation, there is a need of considering the direction of the optical axis of the upper optical phase difference film 4. As the reason of this, whereas the liquid crystal display system is available in a variety including TN and STN systems, the angle formed by linearly polarized light, which is twisted and outputted from the liquid crystal display, and display-screen side lines vary depending on the liquid crystal display system. As a matter of course, the optical axis of the upper optical phase difference film 4 positioned so as to form a specified angle to this linearly polarized light vary in the angle formed with the side line of the upper optical phase difference film 4 depending on the display of liquid crystals. However, the linearly polarized light twisted and outputted from the liquid crystal display 2 and the side line of the display screen does not necessarily become 45°, in which case notwithstanding the optical axis of the upper optical phase difference film 4 is also not parallel to the side line of the upper optical phase difference film 4, the optical-axis direction and the drawing direction of the rolled upper optical phase difference film 4 are parallel to each other. Accordingly, in order that the optical axis of the upper optical phase difference film 4 in the state of being located as a member of the touch panel 1 is given a specified angle to the side line of the upper optical phase difference film 4, the following processes are taken. One process is to give an angle to the cutting for circuit formation. For example, if the optical axis of the upper optical phase difference film 4 of the transparent touch panel 1 should be angled 30° with respect to the side line of the upper optical phase difference film 4, the film material is cut into a rectangular shape of a specified size, also during the cutting for circuit formation, in such a manner that the side line of the film material sheet after cutting will be angled 30° to the side line of the rolled film material sheet, and thereafter the circuit pattern is printed. Another method is to give an angle to the pattern layout. For example, in the case where circuits are formed by printing, giving an angle of 30° on the whole to the pattern layout of the circuit formation plate makes it possible to cut the rolled film material vertically to its drawing direction (of course, in the latter case, because the film material sheet and the pattern layout are angled to each other, the cutting needed to be done with an angle given after the circuit formation in obtaining one film material sheet which is in the state of being set to the transparent touch panel 1 as described later).

Further, during the circuit formation, it is also necessary to keep the transparent conductive film and the leads or the like from unnecessary contact (i.e., unnecessary overlaps). Normally, before the circuit formation, the transparent conductive film is preparatorily patterned into a specified configuration. The patterning process may be a print resist process, or photolithography process, or directly pattern printing of the transparent conductive film.

(Stationary Electrode Portion 5 of Touch Panel 1)

As to the formation of the stationary electrode portion 5, circuit formation is carried out by the generally same processes as in the movable electrode portion 3. In the case where the optically isotropic film 12 or the glass substrate 11 having optical isotropy is located between the lower optical phase difference film 6 and the stationary electrode portion 5, the optically isotropic film 12 or the glass substrate 11 having optical isotropy, which is the target on which the stationary electrode portion 5 is to be directly formed, has no optical axis, so that these members do not need to be angled for the cutting and circuit formation processes. In the case where the stationary electrode portion 5 is directly formed on the lower optical phase difference film 6, the case is utterly the same as in the case where the movable electrode portion 3 is provided on the upper optical phase difference film 4. As the ink material, ink similar to the ink for the movable electrode portion 3 can be used. High temperature drying process is performed for the curing of the binder and the removal of solvents. The drying process is done at a temperature of not less than 100° C. and less than 150° C. for 30-60 minutes (in the case where the stationary electrode portion 5 is provided directly on the lower optical phase difference film 6, needless to say, an upper optical phase difference film whose phase difference of ¼ wavelength is not changed by the heat treatment during the circuit formation is previously selected).

(Insulation Assurance of Touch Panel 1)

After the circuit formation, and before the movable-side sheet (upper optical phase difference film 4), on which the movable electrode portion 3 has been directly formed, and the stationary-side sheet (optically isotropic film 12, glass substrate 11 having optical isotropy, or lower optical phase difference film 6), on which the stationary electrode portion 5 has been directly formed, are combined together to make up the transparent touch panel 1, an insulating layer is formed on at least either one of the movable electrode portion side and the stationary electrode portion side, in order to avoid insulation failures due to contact of a lead and an electrode between the upper and lower members, and to prevent metal oxidation of circuits. Process for forming the insulating layer may be done by print resist process, screen printing, offset printing, roll coater, dispenser, or the like, as in the circuit formation. Material used therefor is an insulative thermosetting resin or the like.

Also, in order to ensure the insulation between the transparent conductive film of the movable electrode portion 3 and the transparent conductive film of the stationary electrode portion 5 in the touch panel 1, and to enable smoother ON/OFF switching of conduction at operations of pressing or releasing the top surface of the touch panel 1 by pen or finger or the like, a multiplicity of spacers 10 are formed between the transparent conductive film of the movable electrode portion 3 and the transparent conductive film of the stationary electrode portion 5. The surface on which the spacers 10 are formed is given by an electrode surface of the transparent conductive film on at least either one of the stationary electrode portion side and the movable electrode portion side. Process for forming the spacers 10 may be screen printing, offset printing, dispenser process, or the like, by which the spacers 10 of any arbitrary configuration are formed directly. Also usable are a photolithography process, print resist process, or the like, by which an overall-formed coating is patterned into the configuration of spacers. The spacers, although not limited in configuration particularly, are desirably of the same configuration and arrayed at fixed intervals so as to eliminate any input-disabled portions and to enable uniform inputs. When the spacers are formed in a dot-like shape, the spacers are desirably made small in diameter and low in height. As an example, an arrangement pattern in which spacers having a diameter of 30-100 µm and a height of 1-15 µm with a spacer pitch of 0.1-10 mm fall upon intersecting points of a plurality of lines crossing one another longitudinally and laterally can be obtained by rotating the pattern to 0-90° with respect to one side line of the touch panel 1.

(Cutting of One Electrode Sheet)

The movable-side sheet (upper optical phase difference film 4), on which the movable electrode portion 3 has been directly formed, and the stationary-side sheet (optically isotropic film 12, glass substrate 11 having optical isotropy, or lower optical phase difference film 6), on which the stationary electrode portion 5 has been directly formed, with circuits formed on these sheets, are further cut into specified size, in the case of the multiple pattern. In the case where the stationary-side sheet is a film, the sheet is cut by Thompson dies, dies, cutting plotter, or the like. In the case of the glass substrate 11 having optical isotropy, the sheet is cut by scriber, breaking machine, or the like. Particularly when the glass substrate 11 having optical isotropy is cut, the cutting edge is desirably put in from a surface opposite to the conductive film because the conductive film surface is too hard to let the edge in. By so doing, the glass cross section is cut finely, by which strength degradation can be prevented.

(Lamination of Upper and Lower Movable-Side Sheet and Stationary-Side Sheet)

The movable-side sheet (upper optical phase difference film 6), on which the movable electrode portion 3 has been directly formed, and the stationary-side sheet (optically isotropic film 12, glass substrate 11 having optical isotropy, or lower optical phase difference film 6), on which the stationary electrode portion 5 has been directly formed, are bonded together by adhesive material or double-sided tape 19, by which a space layer 7 is formed between the electrodes. In the case where circuits are formed in a multiple pattern, preparatorily forming the adhesive material or double-sided tape 19 before cutting the upper and lower movable and stationary-side sheets allows the process time to be reduced, efficiently. The adhesive material or double-sided tape 19 is formed on the periphery of the movable electrode portion 3 or stationary electrode portion 5 and applied so that the two electrode portions 3, 5 are opposed to each other, and then press-fitted with external pressure applied. The adhesive material in place of the double-sided tape 19 is formed by screen printing or the like, and the double-sided tape to be used is previously punched out into a frame shape. These are formed outside the perspective region of the transparent touch panel 1. When the adhesive material or double-sided tape extends to within the perspective region, images at end portions of the touch panel become difficult to view due to seeping. Available adhesives are acrylic, epoxy-base, urethane-base adhesives, their copolymers, or the like, and recommendable double-sided tape is, for example, Nitto Denko Kabushiki Kaisha's 532 or the like.

(Connector)

An externally-takeout portion (connector) 40 for detecting a contact position (i.e. input position) between the upper and lower electrode portions 3, 5 of the transparent touch panel 1 is provided. The method therefor may be a method that electrodes are routed from the two electrode portions 3, 5, respectively, a method that electrodes are routed from either one of the two electrode portions 3, 5, or the like. Electrode-routed portions are preparatorily provided in the transparent touch panel 1, and pressed against and adhered to the connector 40 via an anisotropic conductive adhesive at a temperature of not less than 120° C. and less than 170° C.

This is the process for fabricating the transparent touch panel 1. Next, a process for fabricating the touch-input type liquid crystal display device by combining together the touch panel 1 and the liquid crystal display 2 is described.

(Bonding of Upper Polarizer 8)

The upper polarizer 8 is bonded to the top surface of the upper optical phase difference film 4 of the touch panel 1 fabricated as described above. In the case where a transparent film is further provided on the upper polarizer 8, the upper polarizer 8 and the transparent film may be bonded separately from each other, to the upper optical phase difference film 4 on the touch panel 1, or a previously provided lamination of the upper polarizer 8 and the transparent film may be cut into a specified size and bonded onto the touch panel 1. These films are bonded overall via a transparent adhesive material. The upper polarizer 8 and the transparent film, although not particularly limited in size, are normally bonded so as to be equal in size to the touch panel outline or about 0.1-1 mm inner than the sides of the touch panel outline. This is because sizing outer than the touch panel outline would cause the upper polarizer 8 and the transparent film to be more likely to peel with external force applied. However, the size is not limited to this.

After the upper polarizer 8 is bonded, pressure degassing process is performed at 40-80° C. and 4-9 kg/cm$^2$ for 10-12 minutes. Because the upper polarizer 8, when bonded on the touch panel 1, would cause air bubbles to be mixed between the upper optical phase difference film 4 and the upper polarizer 8 or the transparent film, the above pressure degassing process is intended to remove those air bubbles. By performing this process, air bubbles are diffused while the adhesion property between the films can also be improved.

(Bonding of Lower Optical Phase Difference Film 6 on which Stationary Electrode Portion 5 is not Directly Formed)

In the case where the optically isotropic film 12 or the glass substrate 11 having optical isotropy is used as the stationary-side sheet on which the stationary electrode portion 5 is directly formed, the lower optical phase difference film 6 is disposed between these stationary-side sheet and liquid crystal display 2. The lower optical phase difference film 6 is, desirably, overall bonded onto the members (glass surface of the liquid crystal display portion, or polarizer or other optical phase difference films located on the liquid crystal display portion) on the liquid crystal display 2 side via an adhesive material. The lower optical phase difference film 6 may be preparatorily bonded to the polarizer or other optical phase difference film provided on the liquid crystal display portion, and then bonded to the liquid crystal display portion, or may be bonded separately from each other to the liquid crystal display portion.

After the bonding, desirably, a pressure degassing process is performed. The pressure degassing process is done at 40-80° C. and 4-9 kg/cm$^2$ for 10-120 minutes. By performing this process, air bubbles are diffused while the adhesion property between the films can also be improved.

(Bonding of Stationary-Side Sheet to Liquid Crystal Display Side)

The stationary-side sheet on which the stationary electrode portion 5 is directly formed is bonded to a member on the liquid crystal display side by a double-sided tape or the like, together with a member(s) disposed on the stationary-side sheet on which the stationary electrode portion 5 is directly formed. The stationary-side sheet may be bonded directly onto the member on the liquid crystal display side (in some cases, the lower optical phase difference film 6 is the uppermost layer as stated before), or may be bonded to a casing which is provided between the stationary-side sheet and the members on the liquid crystal display side. Otherwise, the stationary-side sheet may be bonded overall via a transparent adhesive layer or a transparent re-peel sheet.

Next, touch-input type liquid crystal display devices and methods for fabricating the touch-input type liquid crystal display devices according to fourth to sixth embodiments of the present invention are described.

The fourth embodiment has been achieved for the following purposes.

That is, in the liquid crystal display devices according to the first to third embodiments, there have been some cases where the following disadvantages are involved.

First, when the surface of the upper polarizer 8 is poor in durability, it can occur that the surface of the upper polarizer 8 is damaged by pen input or the like so as to lack in practicability.

When moisture is absorbed from the surface of the upper polarizer 8, the upper polarizer 8 becomes more prone to contraction and expansion or distortion, so that the upper optical phase difference film 4 bonded to the upper polarizer 8 is resultantly changed partly in retardation value, in which case irregular colors becomes noticeable as viewed from the observer side and besides the antireflection function might be impaired.

Accordingly, the objects of the fourth to sixth embodiments of the present invention are to provide a transparent touch panel 1 which is superior in surface durability and prevented from moisture absorption into the upper polarizer 8, as well as a touch-input type liquid crystal display device using this touch panel, by solving the above disadvantages.

Now the fourth to sixth embodiments of the present invention are described in detail with reference to the accompanying drawings.

Figure 11:
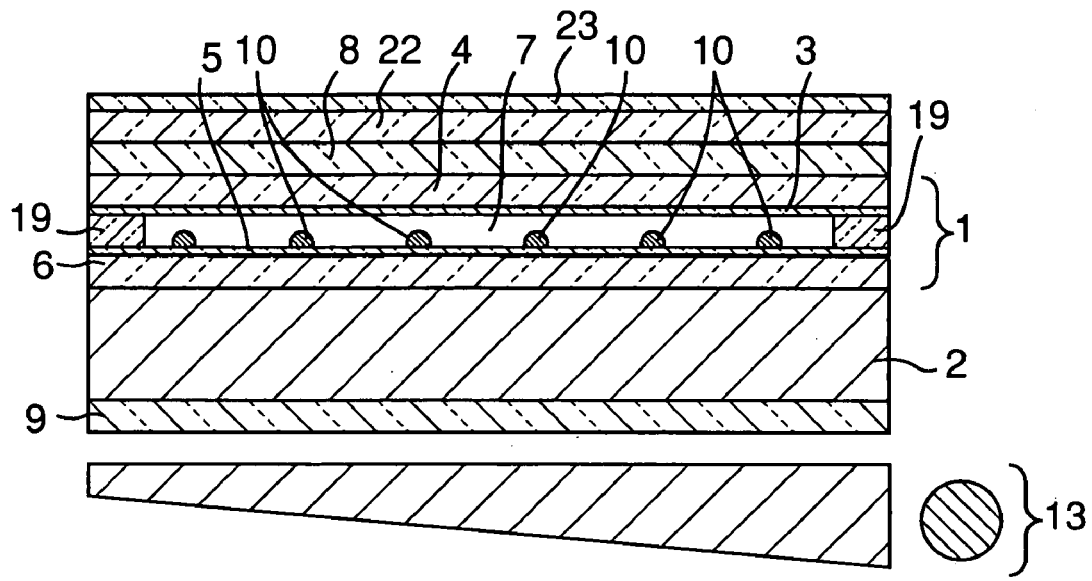
FIG. 11 is a sectional view showing a touch-input type liquid crystal display device (transmission type TN) according to a fourth embodiment of the present invention.

FIG. 11 is a sectional view showing a touch-input type liquid crystal display device (transmission type TN) according to the fourth embodiment.

Figure 12:
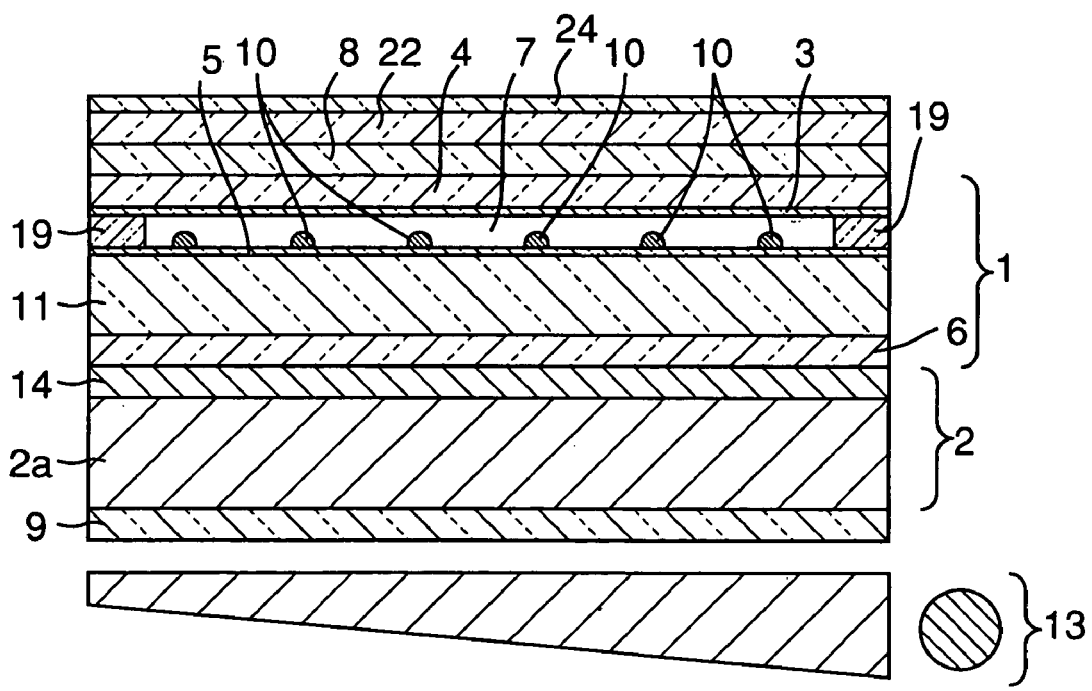
FIG. 12 is a sectional view showing a touch-input type liquid crystal display device (transmission type STN) according to a fifth embodiment of the present invention.

FIG. 12 is a sectional view showing a touch-input type liquid crystal display device (transmission type STN) according to the fifth embodiment.

Figure 13:
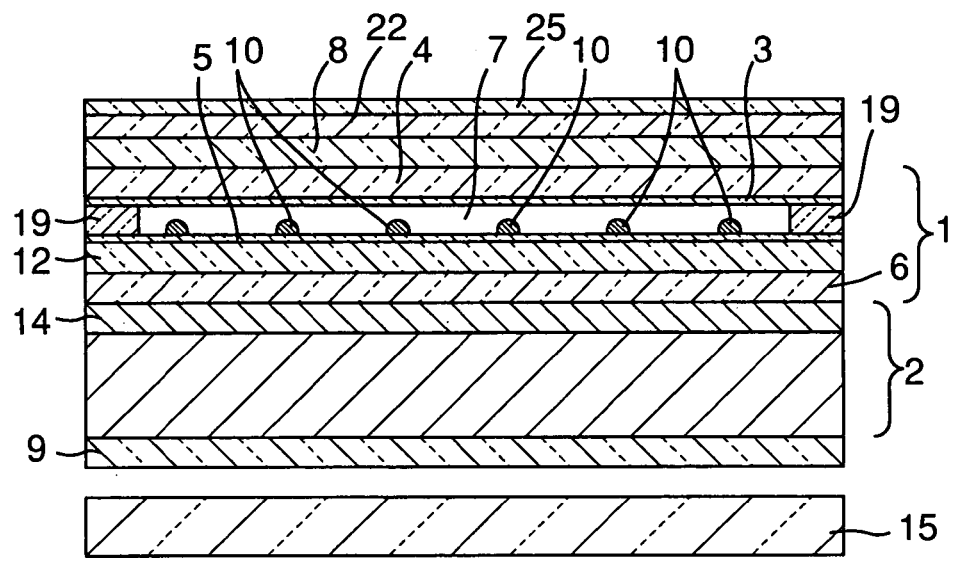
FIG. 13 is a sectional view showing a touch-input type liquid crystal display device (reflection type STN) according to a sixth embodiment of the present invention.

FIG. 13 is a sectional view showing a touch-input type liquid crystal display device (reflection type STN) according to the sixth embodiment.

Figure 14:
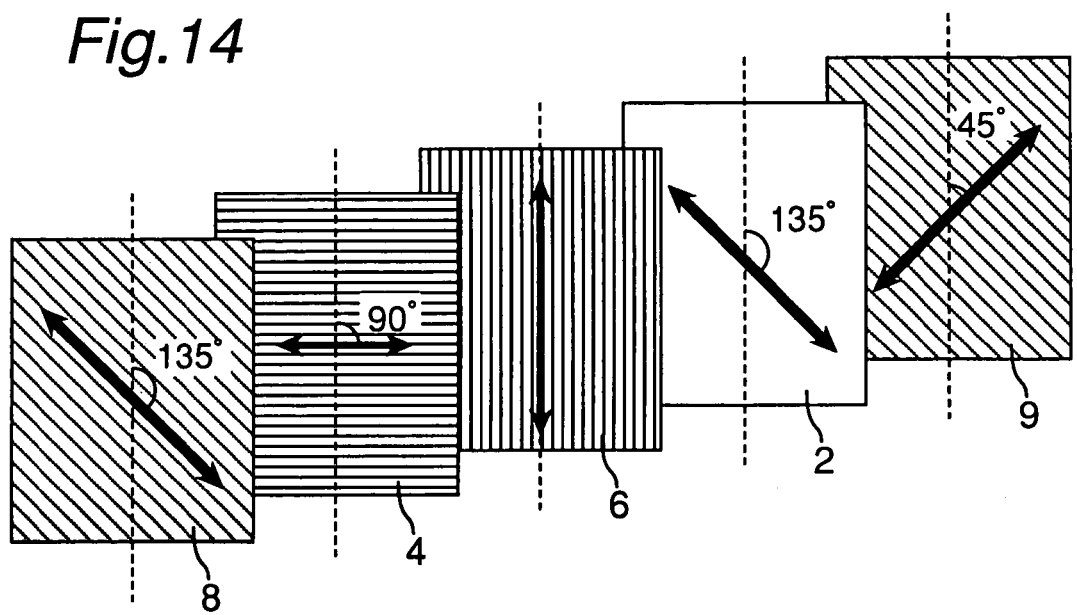
FIG. 14 is an explanatory view of the transmission axis direction and the optical axis direction in the touch-input type liquid crystal display device (TN) according to the foregoing embodiments of the present invention.

FIG. 14 is an explanatory view of the transmission axis direction and the optical axis direction in the touch-input type liquid crystal display device (TN) according to the foregoing embodiments of the present invention.

Figure 15:
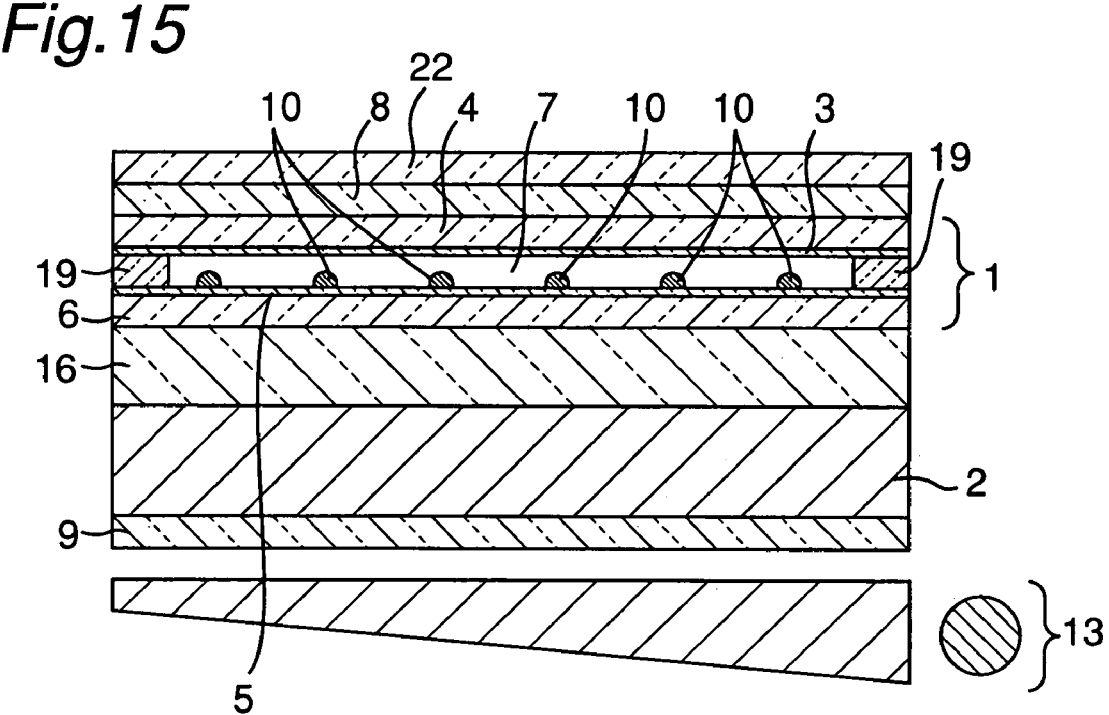
FIG. 15 is a sectional view showing a touch-input type liquid crystal display device (transmission type TN) according to a modification of the fourth embodiment.

FIG. 15 is a sectional view showing a touch-input type liquid crystal display device (transmission type TN) according to a modification of the fourth embodiment.

Figure 16:
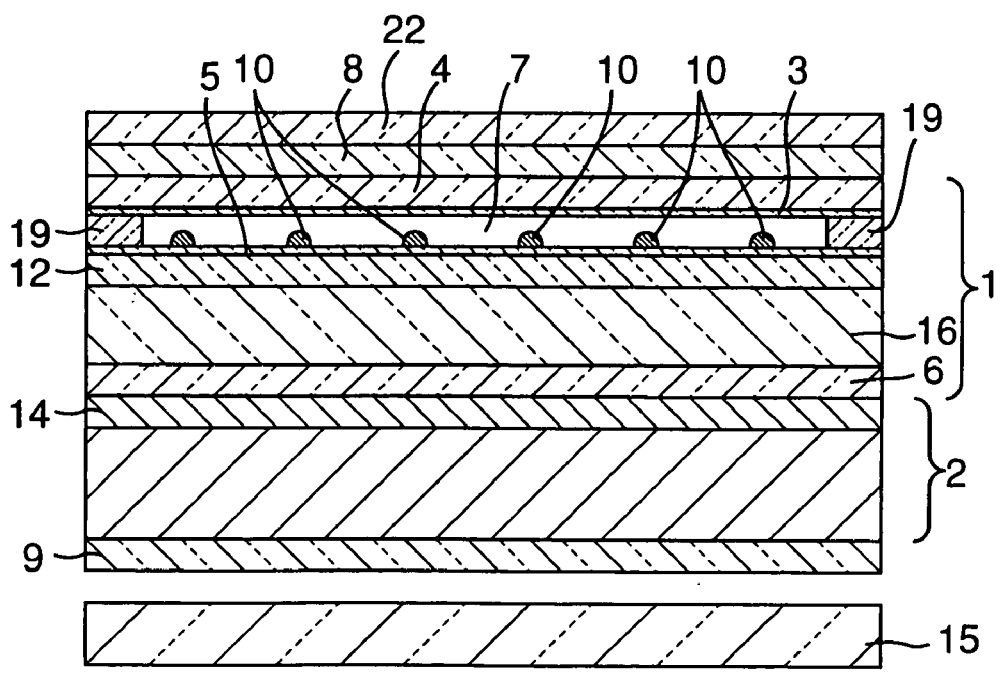
FIG. 16 is a sectional view showing a touch-input type liquid crystal display device (reflection type STN) according to a modification of the sixth embodiment.
Figure 17:
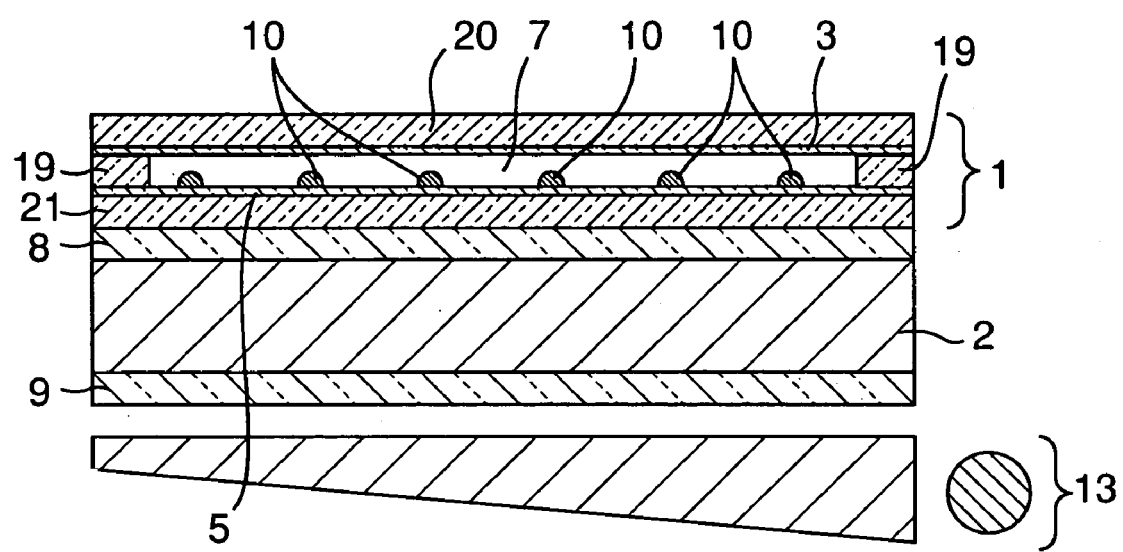
FIG. 17 is a sectional view showing an example of a conventionally general liquid crystal display device equipped with a transparent touch panel.
Figure 18:
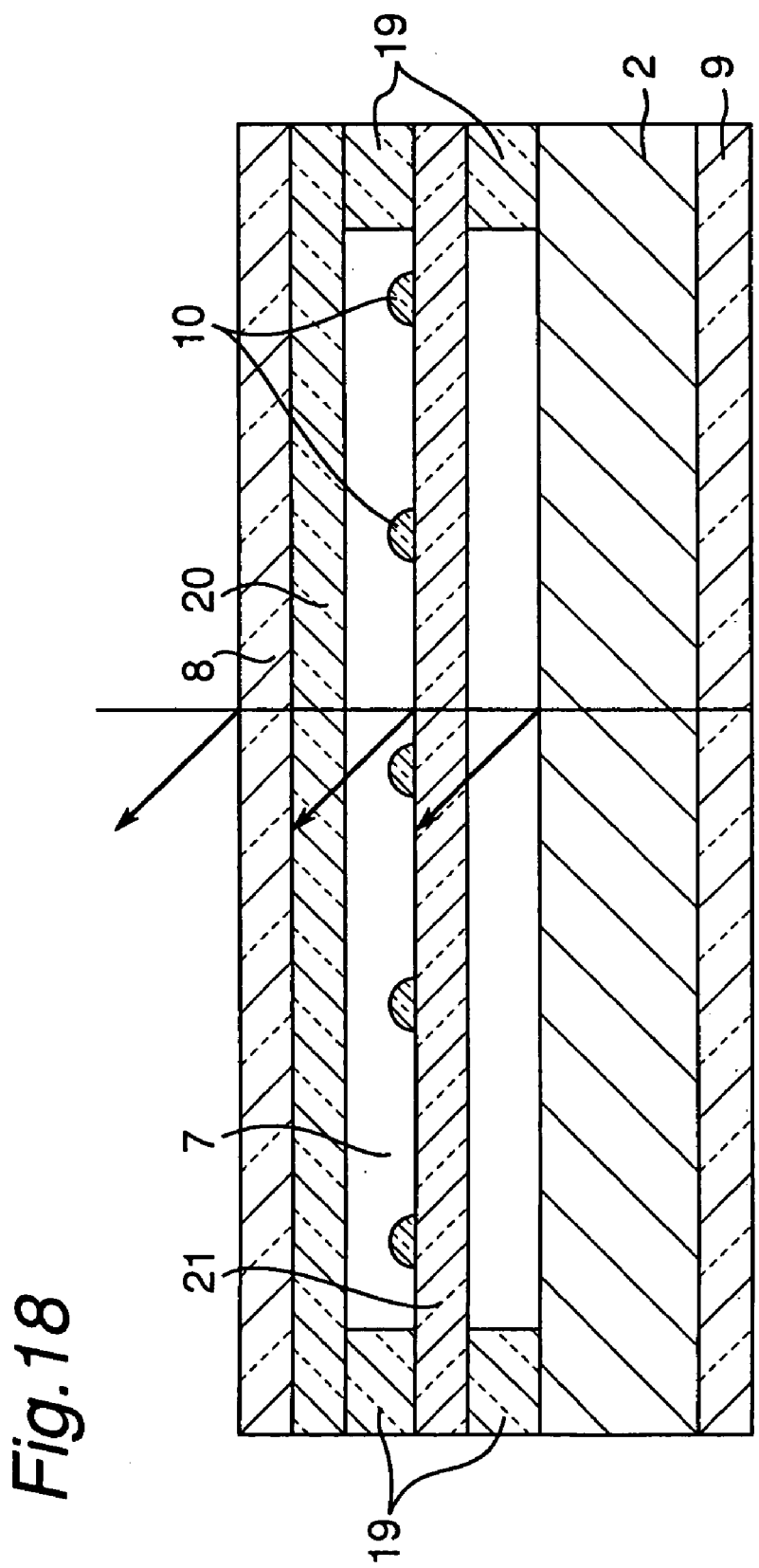
FIG. 18 is a sectional view showing another example of the conventionally general liquid crystal display device equipped with a transparent touch panel.
Figure 19:
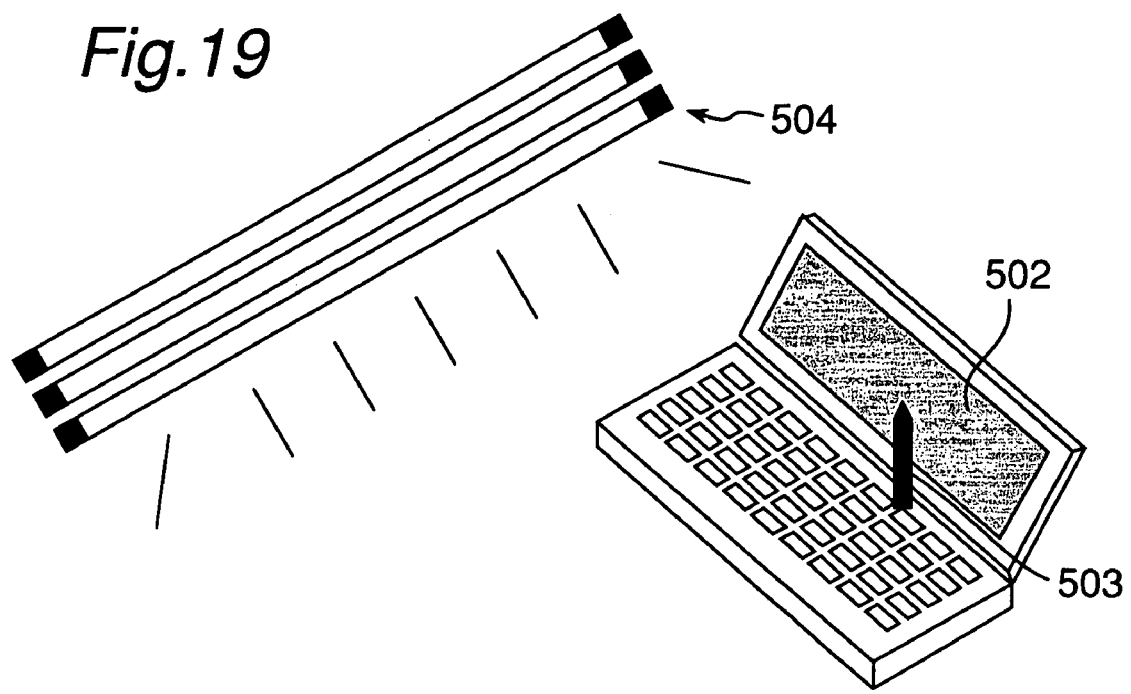
Figure 20:
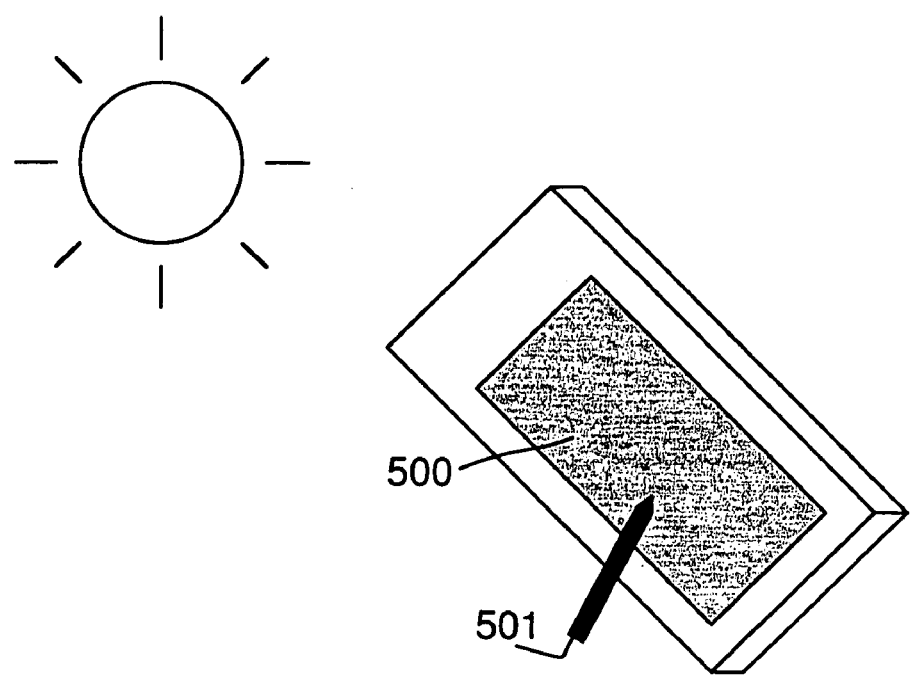
FIG. 20 is an explanatory view for explaining a state in which a portable terminal unit having the conventional liquid crystal display device of FIG. 18 is used outdoors.

FIG. 16 is a sectional view showing a touch-input type liquid crystal display device (reflection type STN) according to a modification of the sixth embodiment.

In the figures, reference numeral 22 denotes a transparent film, 23 denotes a low reflection process layer, 24 denotes an antifouling process layer, and 25 denotes a hard coat process layer.

As the base material for directly forming the stationary electrode portion 5 thereon, the lower optical phase difference film 6 (the fourth embodiment, see FIG. 11), or the glass substrate 11 having optical isotropy (the fifth embodiment, see FIG. 12), or the optically isotropic film 12 (the sixth embodiment, see FIG. 13) is used. These base materials are also processed at high temperatures during the formation of the stationary electrode portion 5 and the circuit formation, as in the case of the upper optical phase difference film 4.

Also, if pressing stability and durability equivalent to those of the glass substrate 11 having optical isotropy are preferred to the thinness in the fourth embodiment, a transparent resin plate 16 having optical isotropy may appropriately be disposed between the transparent touch panel 1 and the liquid crystal display 2 (see FIG. 15). If pressing stability and durability equivalent to those of the glass substrate 11 having optical isotropy are preferred to the thinness in the sixth embodiment, the transparent resin plate 16 having optical isotropy may appropriately be disposed between the optically isotropic film 12 and the lower optical phase difference film 6 (see FIG. 16). As the material of the transparent resin plate 16 having optical isotropy, resins superior in transparency such as polycarbonate resins, acrylic resins, or polystyrene resins are used. The thickness of the transparent resin plate 16 is 0.3-5.0 mm. With a thickness less than 0.3 mm, the transparent resin plate 16 would deteriorate in pressing stability and durability and therefore more prone to yield recesses or other deformations due to repeated inputs. Also, with a thickness over 5.0 mm, the transparent resin plate 16 would be heavier than glass, impracticable as portable equipment.

The transparent film 22 is superior in transparency less in moisture permeability and excellent in dimensional stability in terms of its functions. As the material for the transparent film 22, polyethylene terephthalate, polybutylene terephthalate, polystyrene, polyether ketone, polyolefine, or the like is used. The thickness of the transparent film 22 is not more than 100 µm, and is preferably 80 µm.

Also, a low-reflection processed layer 23 may be provided by performing a low reflection process on the upper surface of the transparent film 22 laminated on the upper surface of the upper polarizer 8. The low reflection process for forming the low-reflection processed layer 23 may be done by applying a low reflection material using a low refractive index resin such as fluororesin or silicon resin; or forming a metallic multilayer film by evaporation or the like; or laminating a low reflection film; or processing the surface into a satin finish state by sandblasting, embossing, mat coating, etching, or the like. It is also possible to perform combinations among these low reflection processes.

Also, an antifouling processed layer 24 may be provided by performing an antifouling process on the upper surface of the transparent film 22 laminated on the upper surface of the upper polarizer 8.

Also, a hard coat processed layer 25 may be provided by performing a hard coat process in order to protect the transparent film 22 laminated on the upper surface of the upper polarizer 8 from wearing due to presses by finger or pen or the like. For example, the hard coat processed layer 25 using acrylic resin, silicon resin, UV curing resin, or the like is formed.

Further, the low-reflection processed layer 23, the antifouling processed layer 24, and the hard coat processed layer 25 may also be formed in combinations of several means as shown above.

By arranging the touch panel 1 and the upper polarizer 8 in the above constitution, reflected light due to the light incident from external can be suppressed in the following manner.

Incident light that has been transmitted through the transparent film 22 from the observer side passes through the upper polarizer 8, becoming linearly polarized light. The rest of functions and effects are the same as in the foregoing embodiments.

The touch-input type liquid crystal display devices according to the above embodiments of the present invention have the above constitutions and functions, and thus produce the following effects.

That is, by setting the polarization axis of the upper polarizer 8 and the optical axis of the upper optical phase difference film 4 so that the two axes form an angle of 45°, incident light enters into the space layer 7 of the transparent touch panel 1 as circularly polarized light or generally circularly polarized light, and reflected circularly polarized light or generally circularly polarized light passes again through the upper optical phase difference film 4, resulting in linearly polarized light vertical to the transmission axis of the upper polarizer 8, so that reflected light can be suppressed.

Also, by setting the lower optical phase difference film 6 between the touch panel 1 and the liquid crystal display 2 in such a manner that the optical axis of the lower optical phase difference film 6 forms an angle of about 90° to the optical axis of the upper optical phase difference film 4 and moreover forms an angle of about 45° to linearly polarized light that should be outputted from the device surface out of the linearly polarized light emitted from the liquid crystal display, coloring of the display screen, as viewed from the observer side, can be suppressed, by which a display screen which is high in contrast and free from coloring can be obtained.

Further, in the touch-input type liquid crystal display device, by applying a lower reflection process to the uppermost surface of the device, reflection of light at the uppermost surface is suppressed.

As a result of these improvements, the liquid crystal displays equipped with the transparent touch panels according to the embodiments of the present invention can offer a display screen which less reflects in a room with fluorescent lamps or the like or in outdoor places, high in contrast and very good at visibility.

The above embodiments of the present invention, by virtue of their constitutions and functions as described above, can provide a touch-input type liquid crystal display device which is high in contrast and high in visibility by virtue of its capability of suppressing reflected light of fluorescent lamps or the like indoors and reflected light due to external light outdoors by means of the upper polarizer 8 and the individual layers behind the upper polarizer 8. Further, the following advantages are offered by virtue of the transparent film 22 laminated on the upper surface of the upper polarizer 8.

That is, by the lamination of the transparent film 22 onto the upper surface of the upper polarizer 8, the surface durability becomes better so that the surface of the upper polarizer 8 can be prevented from being damaged even with pen input or finger input or the like.

Also, by the lamination of the transparent film 22 onto the upper surface of the upper polarizer 8, moisture absorption from the surface of the upper polarizer 8 can be prevented, so that contraction and expansion as well as distortion of the upper polarizer 8 due to the moisture absorption can be suppressed. Therefore, variations of the retardation value of the upper optical phase difference film 4 laminated on the upper polarizer 8 can be suppressed, irregular colors do not occur, and moreover the antireflection function is never impaired.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A touch-input type liquid crystal display device comprising:
   an upper polarizer;
   a lower polarizer;
   a transparent touch panel disposed between said upper polarizer and said lower polarizer, said transparent touch panel comprising an upper optical phase difference film, a movable electrode portion, a stationary electrode portion and a lower optical phase difference film; and
   a liquid crystal display,
   wherein a space is interposed between said upper optical phase difference film and said lower optical phase difference film,
   wherein said transparent touch panel is disposed between said upper polarizer and said liquid crystal display,
   wherein said liquid crystal display is disposed between said transparent touch panel and said lower polarizer,
   wherein said upper optical phase difference film is capable of providing a ¼ wavelength phase delay to light, incident thereon, having a center wavelength within a visible region,
   wherein said movable electrode portion is disposed on a lower surface of said upper optical phase difference film,
   wherein said lower optical phase difference film is capable of providing a ¼ wavelength phase delay to light, incident thereon, having a center wavelength within the visible region,
   wherein said stationary electrode portion is disposed on an upper surface of said lower optical phase difference film,
   wherein an angle formed by an optical axis of said upper optical phase difference film and a polarization axis of said upper polarizer is about 45°,
   wherein an angle formed by an optical axis of said lower optical phase difference film and linearly polarized light to be outputted from said liquid crystal display is about 45°,
   wherein an angle formed by the optical axis of said upper optical phase difference film and the optical axis of said lower optical phase difference film is about 90°, and
   wherein an angle formed by the polarization axis of said upper polarizer and linearly polarized light to be outputted from said liquid crystal display is about 90°,
   wherein said touch-input type liquid crystal display device further comprises a transparent re-peel sheet adhesively bonding overall one of a member on which said stationary electrode portion has been directly formed and said liquid crystal display or all of said member, said liquid crystal display and an other member disposed between said member and said liquid crystal display.

2. The touch-input type liquid crystal display device of claim 1, wherein said stationary electrode portion is disposed directly on an upper surface of said lower optical phase difference film.

3. The touch-input type liquid crystal display device of claim 2, wherein both said upper optical phase difference film and said lower optical phase difference film have a thermal deformation temperature of not less than 150° C.

4. The touch-input type liquid crystal display device of claim 2, wherein both said upper optical phase difference film and said lower optical phase difference film have a thermal deformation temperature of not less than 170° C.

5. The touch-input type liquid crystal display device of claim 1, wherein a glass substrate having optical isotropy is disposed between the stationary electrode portion and the lower optical phase difference film, and the stationary electrode portion is formed directly on the glass substrate having optical isotropy.

6. The touch-input type liquid crystal display device of claim 5, wherein said upper optical phase difference film has a thermal deformation temperature of not less than 150° C.

7. The touch-input type liquid crystal display device of claim 5, wherein said upper optical phase difference film has a thermal deformation temperature of not less than 170° C.

8. The touch-input type liquid crystal display device of claim 1, wherein an optically isotropic film is disposed between the stationary electrode portion and the lower optical phase difference film, and the stationary electrode portion is formed directly on the optically isotropic film.

9. The touch-input type liquid crystal display device of claim 8, wherein both said upper optical phase difference film and said optically isotropic film have a thermal deformation temperature of not less than 150° C.

10. The touch-input type liquid crystal display device of claim 8, wherein both said upper optical phase difference film and said optically isotropic film have a thermal deformation temperature of not less than 170° C.

11. The touch-input type liquid crystal display device of claim 8, further comprising a transparent resin plate having optical isotropy disposed between said optically isotropic film and said lower optical phase difference film.

12. The touch-input type liquid crystal display device of claim 1, further comprising a transparent resin plate having optical isotropy disposed between said transparent touch panel and said liquid crystal display.

13. The touch-input type liquid crystal display device of claim 1, wherein a thickness of said upper optical phase difference film is not less than 50 μm and not more than 150 μm.

14. The touch-input type liquid crystal display device of claim 1, further comprising a transparent film low in moisture permeability and superior in dimensional stability laminated on an upper surface of said upper polarizer.

15. The touch-input type liquid crystal display device of claim 14, further comprising a low-reflection processed layer on an upper surface of said transparent film.

16. The touch-input type liquid crystal display device of claim 14, further comprising an antifouling processed layer on an upper surface of said transparent film.

17. The touch-input type liquid crystal display device of claim 14, further comprising a hard coat processed layer on an upper surface of said transparent film.

* * * * *